(12) United States Patent
Meintschel et al.

(10) Patent No.: US 10,347,949 B2
(45) Date of Patent: Jul. 9, 2019

(54) METHOD FOR MAINTENANCE, REPAIR AND/OR OPTIMIZATION OF A BATTERY AND BATTERY HAVING A NUMBER OF INDIVIDUAL CELLS CONNECTED TO ONE ANOTHER ELECTRICALLY

(71) Applicant: Daimler AG, Stuttgart (DE)

(72) Inventors: Jens Meintschel, Bernsdorf (DE); Dirk Schroeter, Winnenden (DE); Knut Welke, Weilheim an der Teck (DE)

(73) Assignee: Daimler AG, Stuttgart (DE)

( * ) Notice: Subject to any disclaimer, the term of this patent is extended or adjusted under 35 U.S.C. 154(b) by 313 days.

(21) Appl. No.: 15/102,814

(22) PCT Filed: Nov. 5, 2014

(86) PCT No.: PCT/EP2014/002964
§ 371 (c)(1),
(2) Date: Jun. 8, 2016

(87) PCT Pub. No.: WO2015/086102
PCT Pub. Date: Jun. 18, 2015

(65) Prior Publication Data
US 2016/0322673 A1    Nov. 3, 2016

(30) Foreign Application Priority Data

Dec. 12, 2013   (DE) .................. 10 2013 020 942

(51) Int. Cl.
*H01M 2/00* (2006.01)
*H01M 10/42* (2006.01)
(Continued)

(52) U.S. Cl.
CPC ..... *H01M 10/4207* (2013.01); *H01M 2/1077* (2013.01); *H01M 2/206* (2013.01);
(Continued)

(58) Field of Classification Search
CPC .. H01M 2/206; H01M 2/305; H01M 10/4207; H01M 10/425
See application file for complete search history.

(56) References Cited

U.S. PATENT DOCUMENTS

| 2011/0052969 A1* | 3/2011 | Cai .................. H01M 2/204 429/158 |
| 2012/0028098 A1 | 2/2012 | Meehan et al. |

(Continued)

FOREIGN PATENT DOCUMENTS

| CN | 201893387 U | 7/2011 |
| DE | 10 2009 035 477 A1 | 2/2011 |

(Continued)

OTHER PUBLICATIONS

PCT/EP2014/002964, International Search Report dated May 22, 2015 (Three (3) pages).

*Primary Examiner* — Cynthia H Kelly
*Assistant Examiner* — Monique M Wills
(74) *Attorney, Agent, or Firm* — Crowell & Moring LLP

(57) ABSTRACT

A method for maintenance, repair and/or optimization of a battery. The battery has, as components, individual cells connected to one another in series and/or in parallel, having electrical terminal contacts which are connected to one another positively and/or firmly, directly or by cell connectors, forming an overlapping region, and/or a battery monitoring unit having a number of connection elements which are positively and/or firmly connected to the electrical terminal contacts and/or to the cell connectors, forming a further overlapping region. To exchange a component, the positive and/or firm connection of the component to be exchanged to at least one component not be exchanged is separated directly next to the overlapping region and a replacement component is connected positively and/or firmly to the overlapping regions of the at least one com- (Continued)

ponent not be exchanged by the electrical terminal contacts thereof or the connection elements thereof, forming a respectively new overlapping region.

10 Claims, 30 Drawing Sheets

(51) Int. Cl.
   *H01M 2/10* (2006.01)
   *H01M 2/20* (2006.01)
   *H01M 2/30* (2006.01)
   *H01M 2/22* (2006.01)
   *H01M 10/48* (2006.01)

(52) U.S. Cl.
   CPC ............ *H01M 2/22* (2013.01); *H01M 2/305* (2013.01); *H01M 10/425* (2013.01); *H01M 10/482* (2013.01); *H01M 2220/20* (2013.01)

(56) References Cited

U.S. PATENT DOCUMENTS

| 2013/0280587 A1* | 10/2013 | Kim ................. B23K 20/10 429/158 |
| 2014/0229129 A1* | 8/2014 | Campbell ................. H04Q 9/00 702/63 |
| 2014/0363704 A1 | 12/2014 | Bachmann et al. |

FOREIGN PATENT DOCUMENTS

| DE | 10 2009 054 269 A1 | 5/2011 |
| DE | 10 2011 120 470 A1 | 6/2013 |
| JP | 2011-249243 A | 12/2011 |
| JP | 2012-69332 A | 4/2012 |
| JP | 2013-51175 A | 3/2013 |
| KR | 10-2012-0081402 A | 7/2012 |

* cited by examiner

METHOD FOR MAINTENANCE, REPAIR AND/OR OPTIMIZATION OF A BATTERY AND BATTERY HAVING A NUMBER OF INDIVIDUAL CELLS CONNECTED TO ONE ANOTHER ELECTRICALLY

BACKGROUND AND SUMMARY OF THE INVENTION

The invention relates to a method for maintenance, repair and/or optimization of a battery which has, as components, a number of individual cells connected in series and/or in parallel to one another, having electrical terminal contacts which are connected to each other positively and/or firmly for electrical connection, directly or by means of cell connectors, forming an overlapping region, and a battery monitoring unit having a number of connection elements, the battery monitoring unit being connected positively and/or firmly to the electrical terminal contacts and/or to the cell connectors, forming a further overlapping region. Furthermore, the invention relates to a battery having a number of individual cells connected to one another electrically.

Generally, electrochemical high-voltage batteries for vehicle applications are known from prior art, which are formed from several individual cells connected electrically in series and/or in parallel. For the electrical series connection of the individual cells, the electrical terminals thereof are connected directly via an electrically conductive cell connector. Additionally, the electrical terminals of the respective individual cells and/or the cell connectors are electrically connected to a device for cell voltage measurement and for charge equalization, so-called balancing. The device for cell voltage measurement and for charge equalization is, as a rule, assembled in a battery electronic system for several individual cells. Here, a contacting of the electrical terminals of the individual cells with the cell connectors and the electrical terminals and/or the cell connectors with the device for cell voltage measurement and for charge equalization occurs by means of firm-bonding method, such as, for example, laser welding, resistance pressure welding, ultrasonic welding and/or by means of positive-bonding methods such as, for example toxing/clinching, crimping. These produced firm and/or positive connections ensure the respective function over the battery service life even with high mechanical, corrosive and/or thermal loading, wherein the respective connection is not able to be released without disruption.

In 102011120470.2, a battery is described, comprising a number of individual cells connected to one another in series and/or in parallel, wherein the electrical terminals thereof are connected to one another positively and/or firmly for electrical connection, directly or by means of cell connectors, and a battery monitoring unit, which is positively and/or firmly connected to the electrical terminals and/or to the cell connectors. Here, the electrical terminals of the individual cells, the cell connectors for electrical connection of adjacent individual cells and/or the battery monitoring unit respectively have redundant contacting regions for positive and/or firm connection, wherein respectively one of the contact regions which are redundant with respect to one another is connected positively and/or firmly, wherein the further contact region(s) is or are not connected. Additionally, a method for maintenance, repair and/or optimization of such a battery is described.

A further battery is described in DE 10 2009 035 477 A1 which comprises a plurality of individual cells which are connected to one another electrically in series and/or in parallel via cell connectors, wherein at least one cell connector has an integrated electrical fuse element for connection of the individual cells.

US 2012/0028098 A1 discloses a method for repair of a battery having two frames arranged on the front side which respectively have an upper side, a lower side and two sides arranged opposite each other. The front-side frame has, on at least one of the sides, a fixing element to receive a clamp. A frame arranged between the front-side frames likewise has an upper side, a lower side as well as two sides arranged opposite each other, wherein at least one of the sides has an edge. The individual cells arranged in the battery are thereby arranged in the frame and the front-side frame and are contacted electrically to each other via the upper sides of the frame. Furthermore, at least one coolant is arranged between the individual cells. In the method, a clamp is introduced into the fixing element in order to enable a compression of the battery. Then the battery is transported to a workshop by means of the clamp arranged in the fixing means, wherein the battery is supported during the transport by means of the edge. In order to obtain access to a lower side of the battery, the clamp is removed. Following this, the battery cells, the coolant and/or the frames are able to be repaired, wherein an electrical connection is furthermore ensured.

Furthermore, in KR 10-2012-0081402 A, CN 201893387 U, DE 10 2009 054 269 A1 and JP 2012069332 A, batteries as well as methods for repair and/or exchange of such batteries are described.

The object of the invention is to specify a method for maintenance, repair and/or optimization of a battery which is improved relative to prior art, as well as an improved battery having a number of individual cells connected to one another electrically.

In a method for the maintenance, repair and/or optimization of a battery which has, as components, a number of individual cells connected to one another in series and/or in parallel, having electrical terminals which are connected to one other positively and/or firmly for electrical connection, directly or by means of cell connectors, forming an overlapping region, and/or a battery monitoring unit having a number of connection elements which are connected positively and/or firmly to the electrical terminals and/or to the cell connectors, forming a further overlapping region, it is provided according to the invention that, to exchange a component, the positive and/or firm connection of the component to be exchanged to at least one component not to be exchanged is separated directly next to the overlapping region and a replacement component is connected positively and/or firmly to the overlapping regions of the at least one component not be exchanged by means of the electrical terminals or connection elements thereof, forming a respective, new overlapping region.

It is possible by means of the method to remove components of the battery for repair, maintenance and/or exchange, wherein the electrical terminals or the connection elements of the components to be exchanged are separated and the respective overlapping region on the at least one component not be exchanged remains, such that this is furthermore connected firmly to a detached section of the terminal or of the connection element of the component to be exchanged. Therefore, the component to be exchanged can be disassembled from the battery in a simple manner, wherein a risk of damage to the at least one component not to be exchanged is minimized. For the assembly of the replacement component, this is connected firmly and positively to the already present joint connection of the at least one component not to be exchanged with its terminals or connection elements.

Costs and time during maintenance, repair and/or optimization of the battery can thereby be reduced in a profitable manner.

For the disassembly of the component to be exchanged, the positive and/or firm connection of the component to be exchanged to the at least one component not to be exchanged is separated by means of sheet cutting, grinding, milling, sawing, laser cutting, water jet cutting and/or micro-flame cutting. Therefore, the positive and/or firm connection can optionally be separated by means of generally known mechanical methods using a tool contact or by means of contactless methods.

In the event that the replacement component is an individual cell, then the electrical terminal contacts thereof are angled in such a way that these are each able to be arranged below or above the overlapping region of the at least one individual cell not to be exchanged. Therefore, the terminal contacts, in the assembled state, have a position which is offset to the terminal contacts or connection elements of the disassembled individual cells, the position enabling these to be arranged on or under the overlapping regions of the at least one individual cell not to be exchanged. Therefore it is possible to firmly and positively connect the individual cells to the at least one individual cell not to be exchanged via the already present joint points.

If the replacement component is alternatively the battery monitoring unit, then the connection elements thereof are angled in such a way that these are able to be arranged above the overlapping region of the individual cells arranged respectively in the battery. Therefore, the connection elements, in the assembled state, have a position which is offset to the connection elements of the disassembled battery monitoring unit, the position enabling these to be arranged on the overlapping regions of the individual cells arranged in the battery. Therefore it is possible to firmly and positively connect the battery monitoring unit to the individual cells via the already present joint points.

If the replacement component is an individual cell and thereby formed in particular as a bipolar flat-cell frame, the firm and/or positive connection of the individual cell to the at least one individual cell not to be exchanged is produced by means of ultrasonic welding. For this purpose, an ultrasonic welding tool, consisting of an anvil and a high-frequency sonotrode, is used, between which the new overlapping region is arranged, wherein a mechanically stable firm and positive connection is able to be produced between the individual cells by means of the sonotrode.

If the replacement component is an individual cell formed as a pouch cell or the battery monitoring unit, the positive and/or firm connection of the pouch cell to the at least one pouch cell not to be exchanged or the positive and/or firm connection of the battery monitoring unit to the individual cells of the battery is produced by cold soldering. This enables reduced effort compared to ultrasonic welding since the arrangement of the ultrasonic welding tool, in particular the anvil and the sonotrode, is problematic in the case of individual cells formed as pouch cells or the battery monitoring unit due to the comparably small overlapping regions. For cold soldering, here soldered sheets are arranged on the new overlapping regions which have an exothermically reactive material. The reaction of the material can here be caused by means of a short current pulse, such that it is possible, for example, to couple the battery to a resistor and therefore to use the electrical energy of the battery for cold soldering.

A battery has, as components, a plurality of individual cells connected to one another in series and/or in parallel, having electrical terminal contacts which are connected to one another positively and/or firmly for electrical connection, directly or by means of cell connectors, forming an overlapping region, and a battery monitoring unit having a number of connection elements which are connected to the electrical terminal contacts and/or to the cell connectors in a positive and/or firm manner, forming a further overlapping region. According to the invention, a replacement component has terminal contacts or connection elements angled in such a way that this is arranged respectively above and/or below the overlapping region with a component connected to the replacement component, wherein a new overlapping region is formed.

Exemplary embodiments of the invention are explained in more detail below by means of drawings.

DETAILED DESCRIPTION OF THE DRAWINGS

Figure 1:
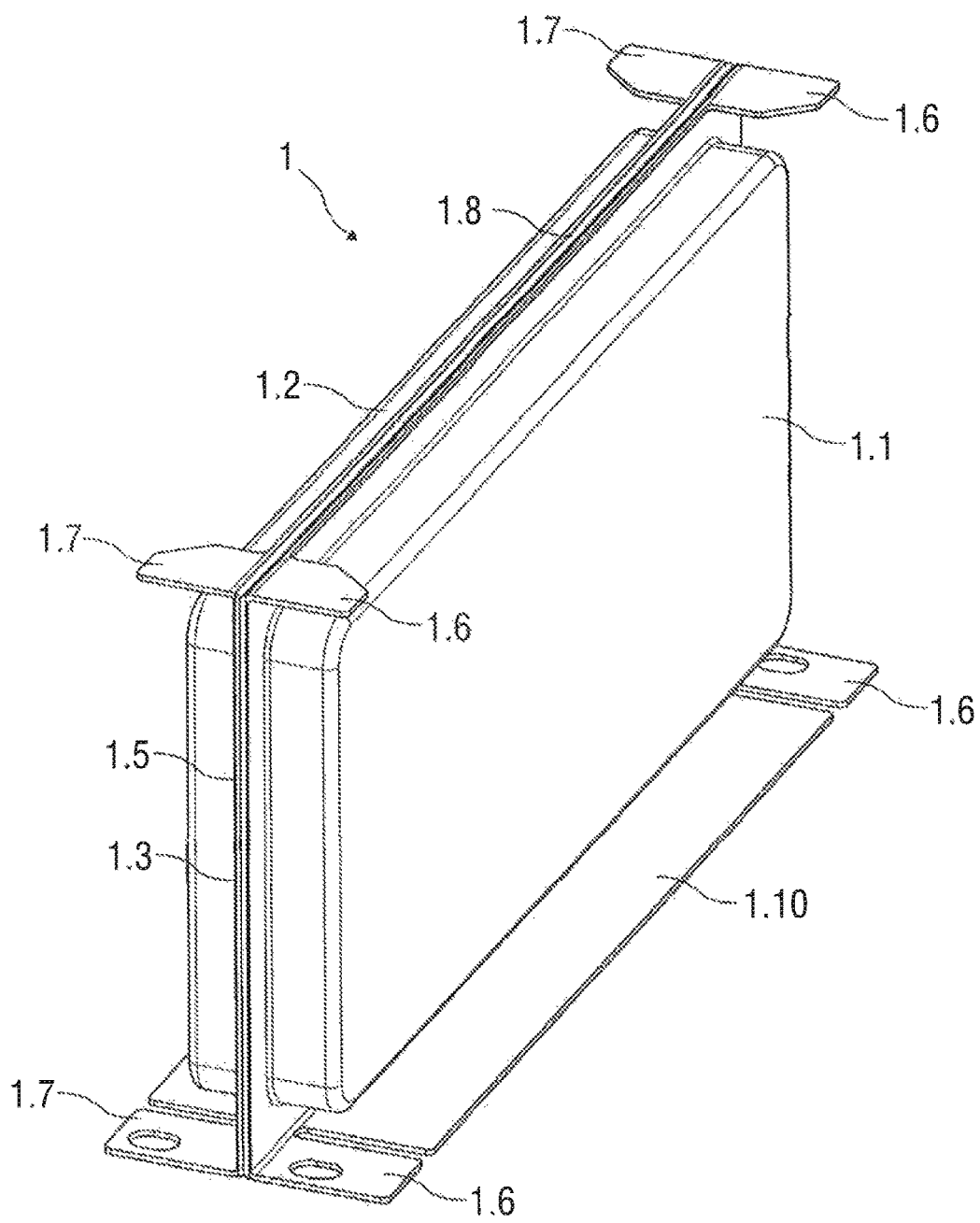
FIG. 1 schematically, in a perspective view, an individual cell formed as a bipolar flat-cell frame, FIG. 2 schematically, in a perspective view, a cell block formed from bipolar flat-cell frames in an exploded depiction, FIG. 3 schematically, in a perspective view, the cell block in the assembled state, FIG. 4 schematically, the cell block according to FIG. 3 in a side view, FIG. 5 schematically, in a perspective view, the cell block according to FIG. 3 having an individual cell to be exchanged, FIG. 6 schematically, in a perspective view, the cell block after separation of the individual cell to be exchanged, FIG. 7 schematically, in a perspective view, an enlarged section of an upper cavity formed by separation of the individual cell to be exchanged, FIG. 8 schematically, a side view of the cell block according to FIG. 6, FIG. 9 schematically, in a perspective view, an individual cell to be newly inserted into the cavity of the cell block, FIG. 10 schematically, in a perspective view, the cell block during insertion of the new individual cell in a partially exploded depiction, FIG. 11 schematically, a side view of the cell block during insertion of the new individual cell in a partially exploded depiction, FIG. 12 schematically, in a perspective view, the cell block during connection of the individual cell inserted into the cell block to the adjacent individual cells by means of a welding tool, FIG. 13 schematically, in a perspective view, the cell block after the connection of the individual cell used in the cell block, FIG. 14 schematically, an enlarged section having two overlapping regions of the newly inserted individual cell and respectively an adjacent individual cell, FIG. 15 schematically, a side view of the cell block according to FIG. 13, FIG. 16 schematically, in a perspective view, individual cells formed as pouch cells, FIG. 17 schematically, in a perspective view, a section from an assembled cell block having four individual cells according to FIG. 16, FIG. 18 schematically, an enlarged section of two individual cells arranged adjacently in the cell block having welded terminal contacts in a cross-sectional depiction, FIG. 19 schematically, in a perspective view, the section according to FIG. 17 after the separating of two terminal contacts of an individual cell to be exchanged, FIG. 20 schematically, an enlarged section from FIG. 19, FIG. 21 schematically, in a perspective view, the section of the cell block according to FIG. 18 having an individual cell to be exchanged having separated terminal contacts in a partially exploded depiction, FIG. 22 schematically, in a perspective view, the section of the cell block according to FIG. 21 during insertion of a new individual cell, FIG. 23 schematically, in a perspective view, the section of the cell block after the insertion and connection of the new individual cell, FIG. 24 schematically, in a perspective view, an enlarged section of the newly inserted individual cell having a new overlapping region, FIG. 25 schematically, an enlarged section having the newly inserted individual cell and an adjacent individual cell and a new overlapping region, FIG. 26 schematically, in a perspective view, a cell block having individual cells according to FIG. 16 and a battery monitoring unit in a partially exploded depiction, FIG. 27 schematically, in a perspective view, the cell block in the assembled state having a fastened battery monitoring unit, FIG. 28 schematically, in a perspective view, an enlarged section of a battery monitoring unit to be exchanged, fastened to the cell block, FIG. 29 schematically, in a perspective view, the enlarged section according to FIG. 28 after the separation of the battery monitoring unit to be exchanged, and FIG. 30 schematically, in a perspective view, the enlarged section according to FIG. 29 having a newly inserted battery monitoring unit.

Parts which correspond to one another are provided with the same reference numerals in all figures.

In FIGS. 1 to 15, a first embodiment of the invention is depicted and described in more detail.

Figure 2:
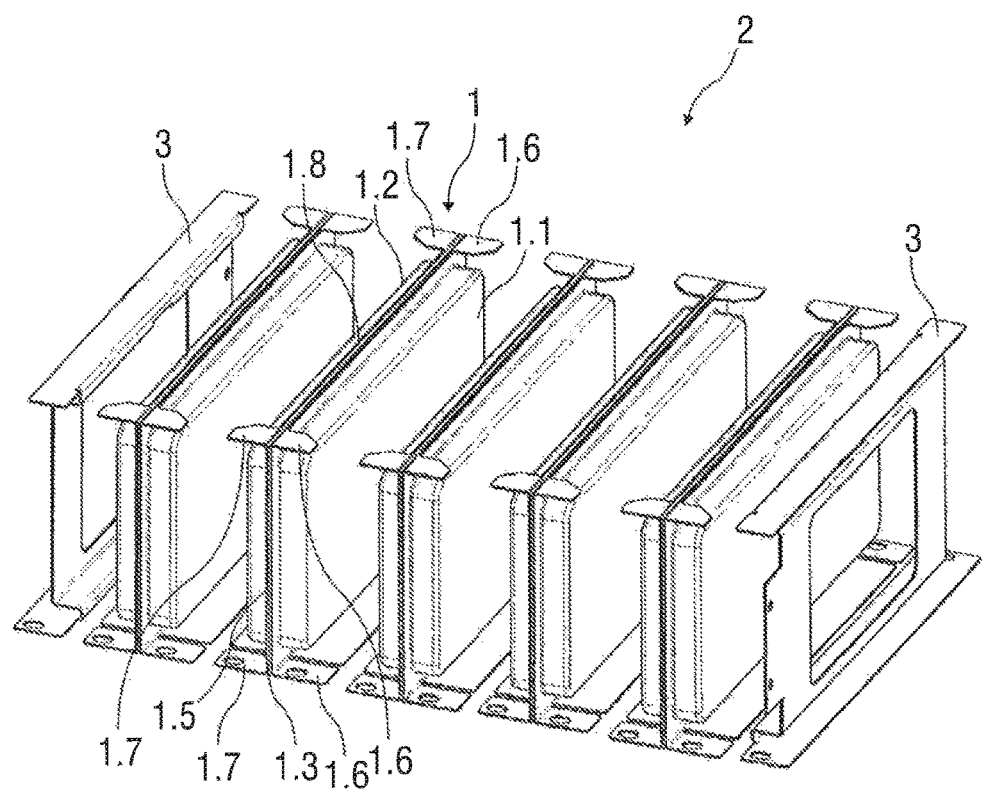
Figure 3:
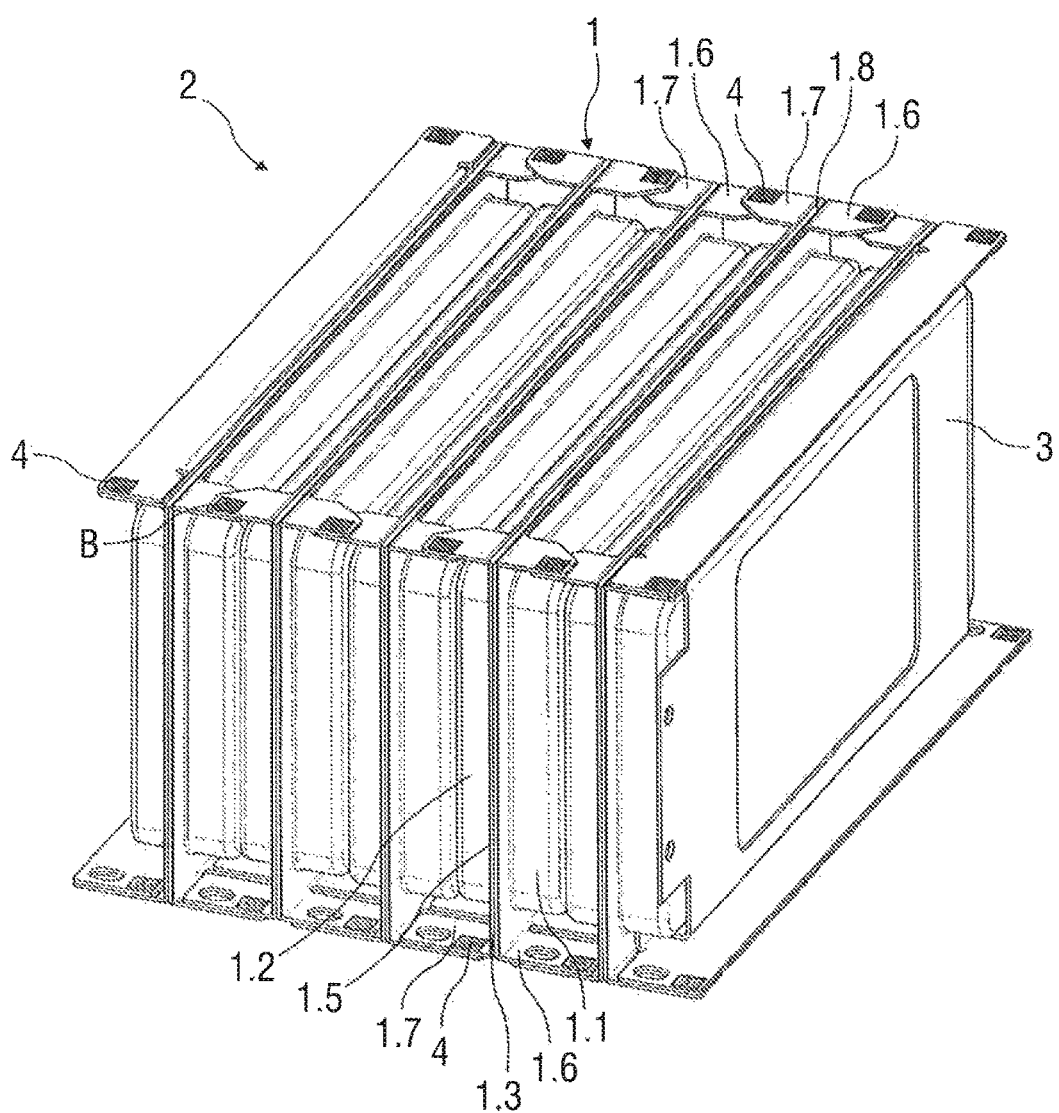
Figure 4:
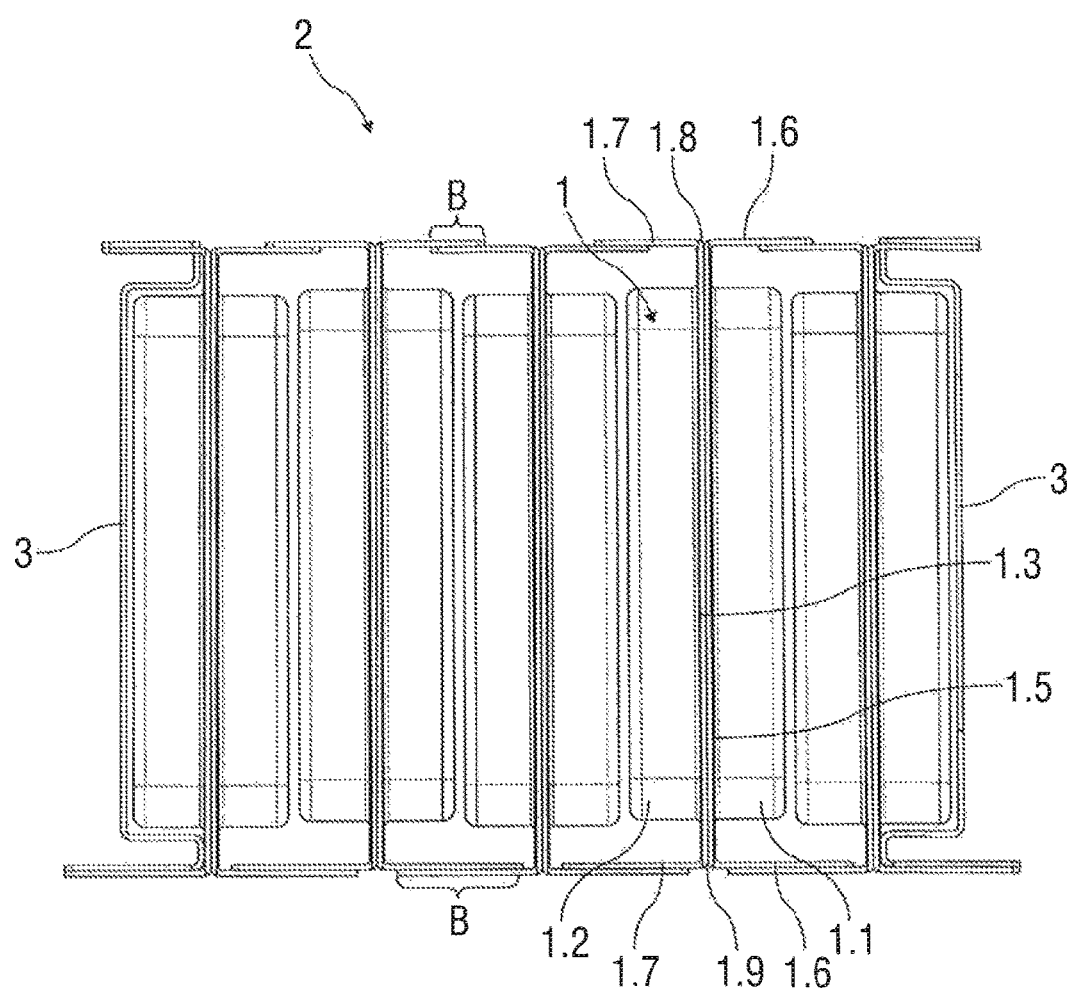

FIG. 1 shows, in a perspective view, an individual cell 1 formed as a bipolar flat-cell frame, which is a component of a cell block 2 which is depicted in more detail, in FIGS. 2 to 4, among others. For this purpose, FIG. 2 shows the cell bock 2 having unwelded individual cells 1 in an exploded depiction. In FIG. 3, the cell block 2 is depicted in the assembled state having welded individual cells 1. FIG. 4 shows the cell block 2 according to FIG. 3 in a side view.

The cell block 2 is a component of a battery which is, in particular, a vehicle battery for an electric vehicle, a hybrid vehicle or a vehicle operated with fuel cells. Here, the battery is a traction battery of such a vehicle.

The individual cell 1 formed as a bipolar flat-cell frame has a predominantly metallic housing which is formed, in the present embodiment, from two housing shells 1.1, 1.2, which respectively have an edge region which is angled outwards at right angles for the formation of a flange. For example, the housing shells 1.1, 1.2 are shaped by a shaping process, for example by embossing, pressing, deep drawing or by extrusion.

An electrochemically active part of the individual cell 1 in the form of an electrode foil arrangement 1.3 is arranged in the housing, the electrode foil arrangement being formed as an electrode stack or electrode coil and comprising layers of cathode and anode foils which are separated respectively by a separator. In the case of lithium ion batteries, the electrode foil arrangement 1.3, for example, comprises coated aluminum and copper foils. The anode, cathode and separator foils can here be stacked as individual sheets or coiled or wound flat in the form of bands or the separator is formed to be band-shaped and folded in a Z-shape, wherein this is inserted laterally into the pockets of the cathode and anode sheets being formed.

The anode and cathode foils are uncoated on at least one edge and are guided out of the electrode foil arrangement 1.3 in sections, wherein respectively the guided-out sections of the anode foils and the cathode foils are connected to one another to form a current diverter tab.

The current diverter tabs are here connected respectively to a housing shell 1.1, 1.2 such that the housing shells 1.1, 1.2 guide voltage and therefore respectively form an electrical terminal of the individual cell 1. For example, a first housing shell 1.1 is a positive terminal and a second housing shell 1.2 is a negative terminal of the individual cell 1.

To connect the current diverter tabs to the respective housing shell 1.1, 1.2, firm-bonding methods are used, such as, for example, pressure or fusion welding methods, in particular resistance spot welding, ultrasonic welding or laser welding. Alternatively, a non-positive connection is also possible, for example by riveting.

The housing shells 1.1, 1.2 are furthermore separated from one another by an electrically insulating frame 1.4 which is arranged between these and circulates in the region of the flange, and which is produced for this purpose from a plastic.

A heat dissipated from the individual cell 1 is emitted via the housing shells 1.1, 1.2 to a cooling plate which is not depicted in more detail and which is flowed through by a cooling agent or a coolant. For electrical insulation of the housing shells 1.1, 1.2 and the predominantly metallic cooling plate, a heat conductor foil which is likewise not depicted in more detail is arranged therebetween.

To seal the individual cell 1, the housing shells 1.1, 1.2 are connected to each other firmly in the region of their flanges, wherein preferably a hot pressing method is used, by means of which a sealing flange 1.5 is formed. For this, the frame 1.4 is formed at least in sections, in particular in the region of the sealing flange 1.5, from a thermoplastic material which, after the cooling, enters into a firm connection with the housing shells 1.1, 1.2. Alternatively, the housing shells 1.1, 1.2 can also be glued to each other.

For electrical contacting of the individual cells 1 arranged in the cell block 2, tab-like partial pieces which are angled outwards from the flanges of the housing shells 1.1, 1.2 are arranged on these, the partial pieces being connected flush and in an electrically conductive manner to the current diverter tab of the electrode foil arrangement 1.3 and therefore respectively forming a terminal contact 1.6, 1.7.

An individual cell 1 has, in the present exemplary embodiment, eight terminal contacts 1.6, 1.7, wherein respectively one of the housing shells 1.1, 1.2 has four terminal contacts 1.6, 1.7 of a polarity which corresponds to the polarity of the housing shells 1.1, 1.2. Here, such a terminal contact 1.6, 1.7 is arranged respectively on a front-side end of an upper side 1.8 and respectively on a front-side end of a lower side 1.9 of the individual cell 1.

The terminal contacts 1.6, 1.7 are here angled outwards in such a way that these are angled, in the assembled state of the cell block 2, in the direction of the longitudinal extension thereof from the individual cell 1, and therefore are facing towards an adjacent individual cell 1 or an adjacent electrical connection element 3. The terminal contacts 1.6, 1.7 of a housing shell 1.1, 1.2 are here angled in a rectified manner, whereas a first terminal contact 1.6 of a first housing shell 1.1 has a different polarity from a second terminal contact 1.7 of the second housing shell 1.2 and is angled in a contrary direction to this second terminal contact 1.7.

The individual cells 1 additionally have two further partial pieces 1.10 angled outwards, wherein respectively, one of the partial pieces is arranged on the lower side 1.9 between the terminal contacts 1.6, 1.7. These partial pieces are here, equivalent to the terminal contacts 1.6, 1.7, protruding in the direction of the longitudinal extension of the cell block 2 and serve for an improved mechanical fixing of the individual cells 1 in the cell block 2.

In order to electrically connect adjacent individual cells 1 to one another, the terminal contacts 1.6, 1.7 which are facing towards one another are firmly connected to one another, for example by means of ultrasonic welding. For this purpose, a terminal contact 1.6, 1.7 of an individual cell 1 is arranged in sections over or under the terminal contact 1.6, 1.7 facing towards it, such that an overlapping region B is formed in which the two terminals 1.6, 1.7 are welded to one another respectively by a welding point 4, as is depicted in FIG. 3.

Figure 12:
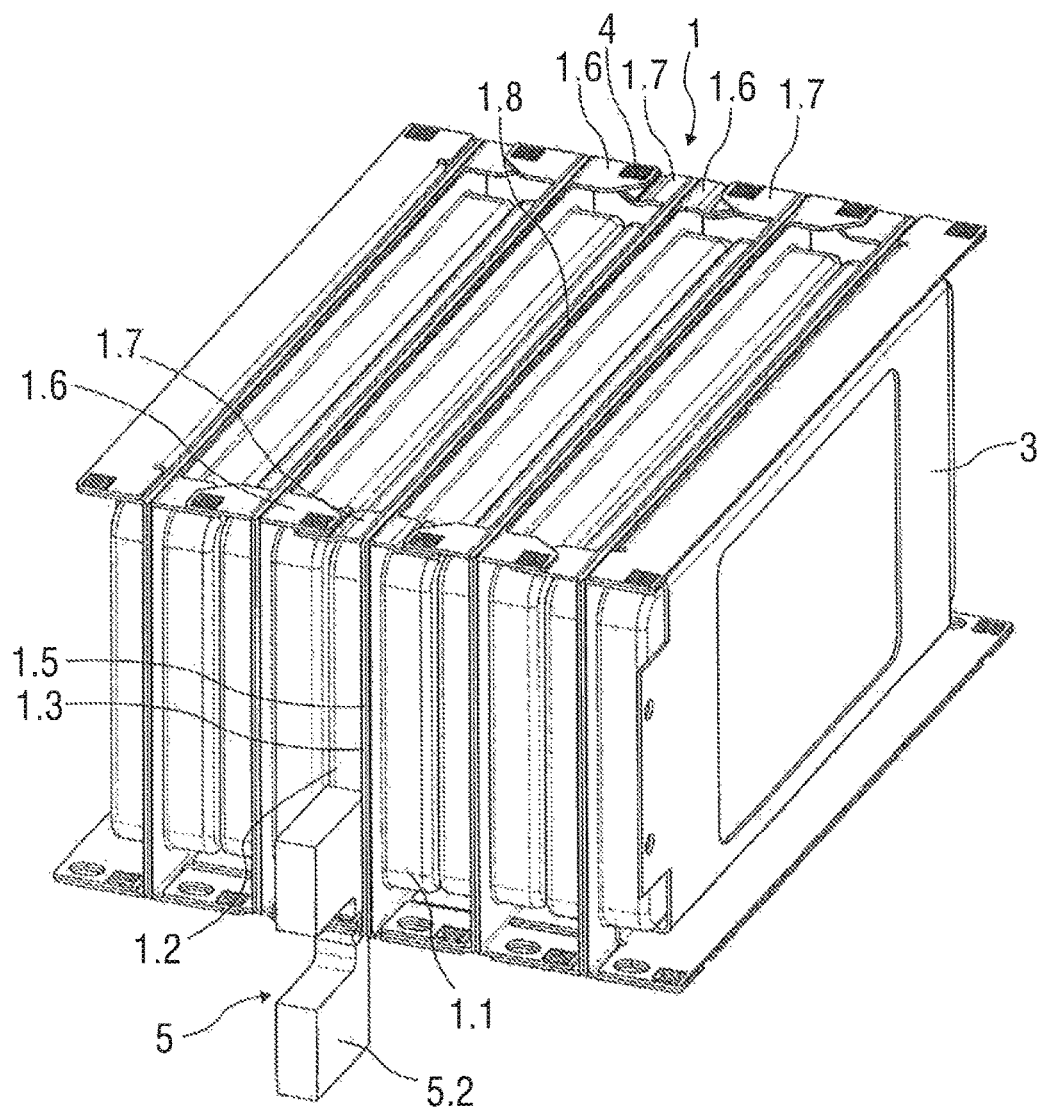

For welding, a welding tool 5 made from a high-frequency moveable sonotrode 5.1 and a fixed anvil 5.2 is used, which is depicted in more detail in FIG. 12. The overlapping region B therefore represents a contacting region of the individual cells 1.

In the present exemplary embodiment, the individual cells 1 are connected to one another electrically in series in the cell block 2. Alternatively, the individual cells 1 can also be connected electrically in parallel.

Respectively, an electrical connection element 3 is arranged on the front-side ends of the cell block 2, the connection element forming a high-voltage contact to tap current and voltage and being formed from a bending sheet metal part.

Figure 5:
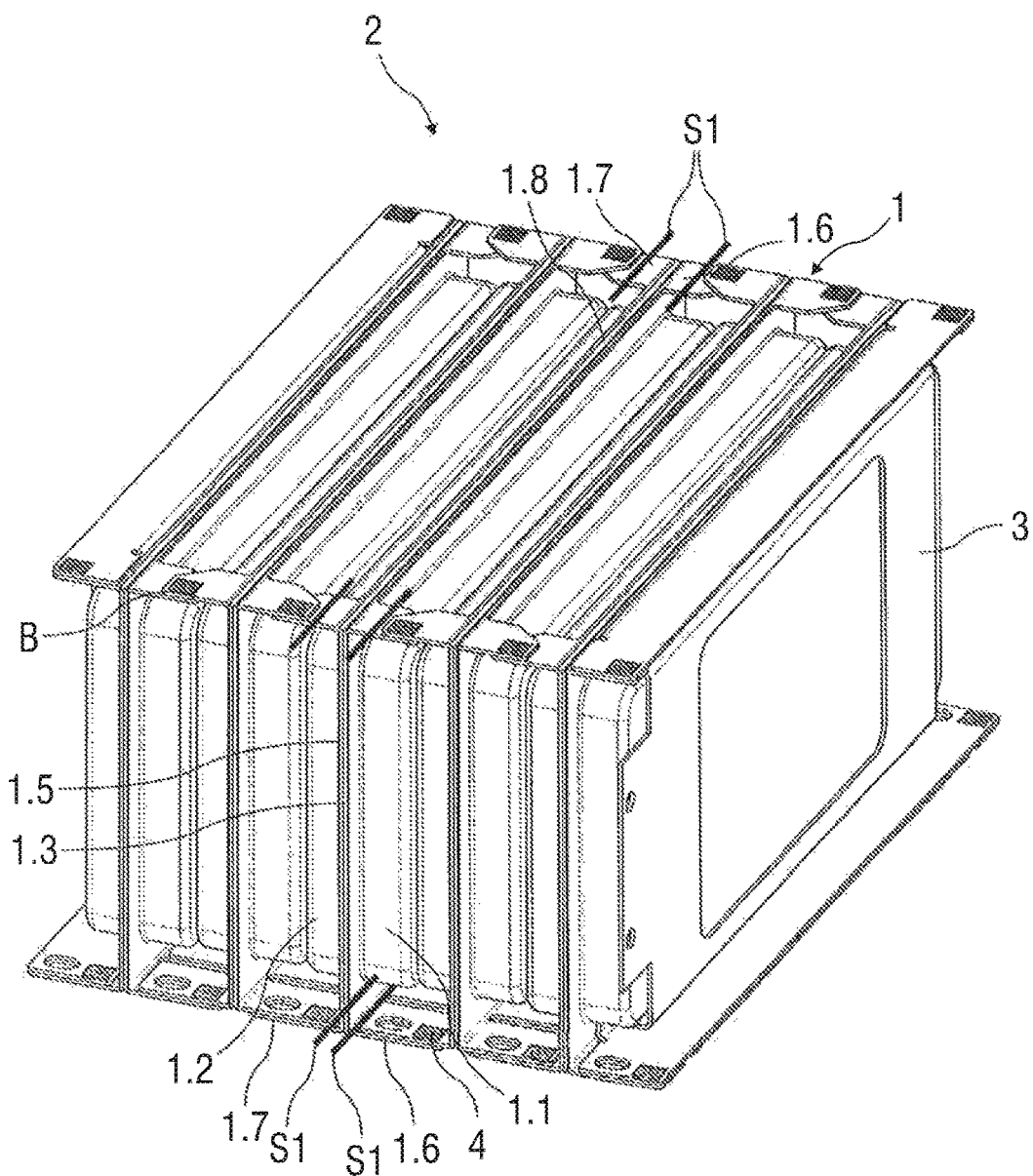

FIG. 5 shows the previously described cell block 2 in a perspective view having drawn-in first intersecting lines 51 which respectively represent a separating point for the exchange of a defective individual cell 1 arranged in the cell block 2. For the disassembly of the defective individual cell 1, this is separated from the cell block 2 along the first intersecting lines 51. The first intersecting lines 51 are arranged, in the sense of the invention, on the terminal contacts 1.6, 1.7 of the defective individual cell 1, directly next to the overlapping region B.

The separation of the defective individual cell 1 can occur by means of mechanical processing using tool contact, such as, for example, plate cutting, grinding, milling, sawing or by means of contactless methods such as, for example, laser cutting, water jet cutting, micro flame cutting.

Additionally, it is possible to provide the terminal contacts 1.6, 1.7 of the individual cells 1 with target break points, for example in the form of a notch, in order to facilitate a separation of the defective individual cell 1.

Figure 6:
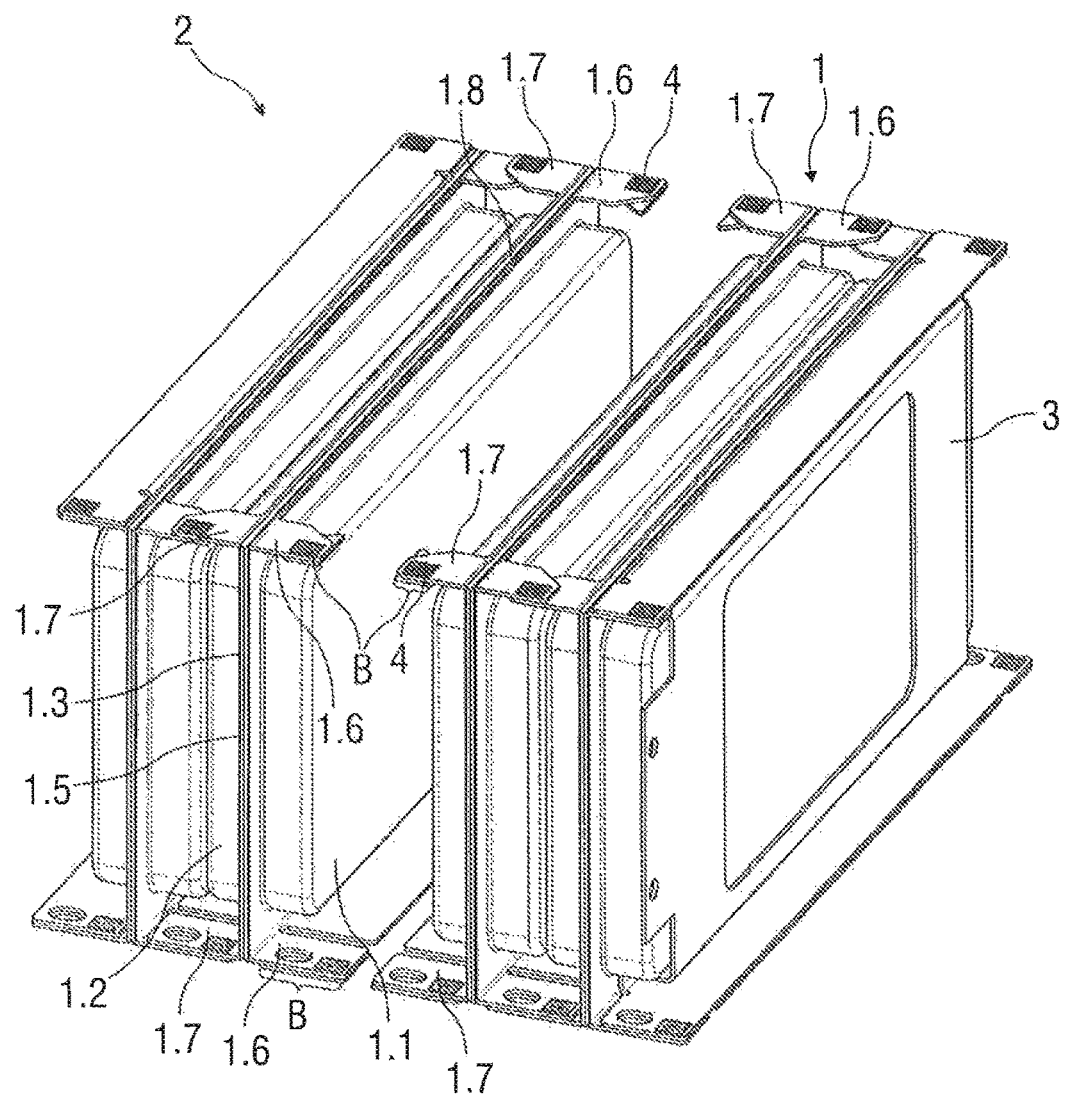
Figure 7:
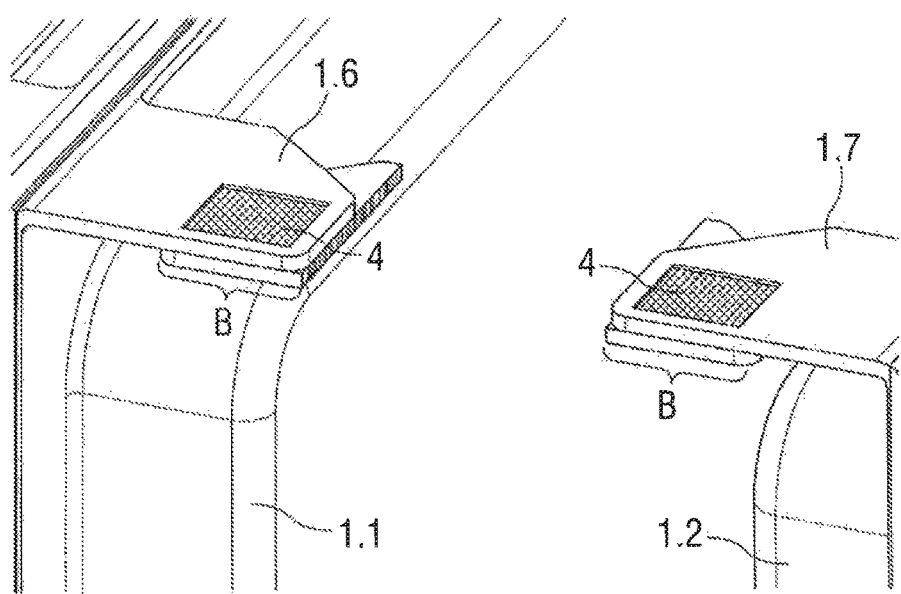
Figure 8:
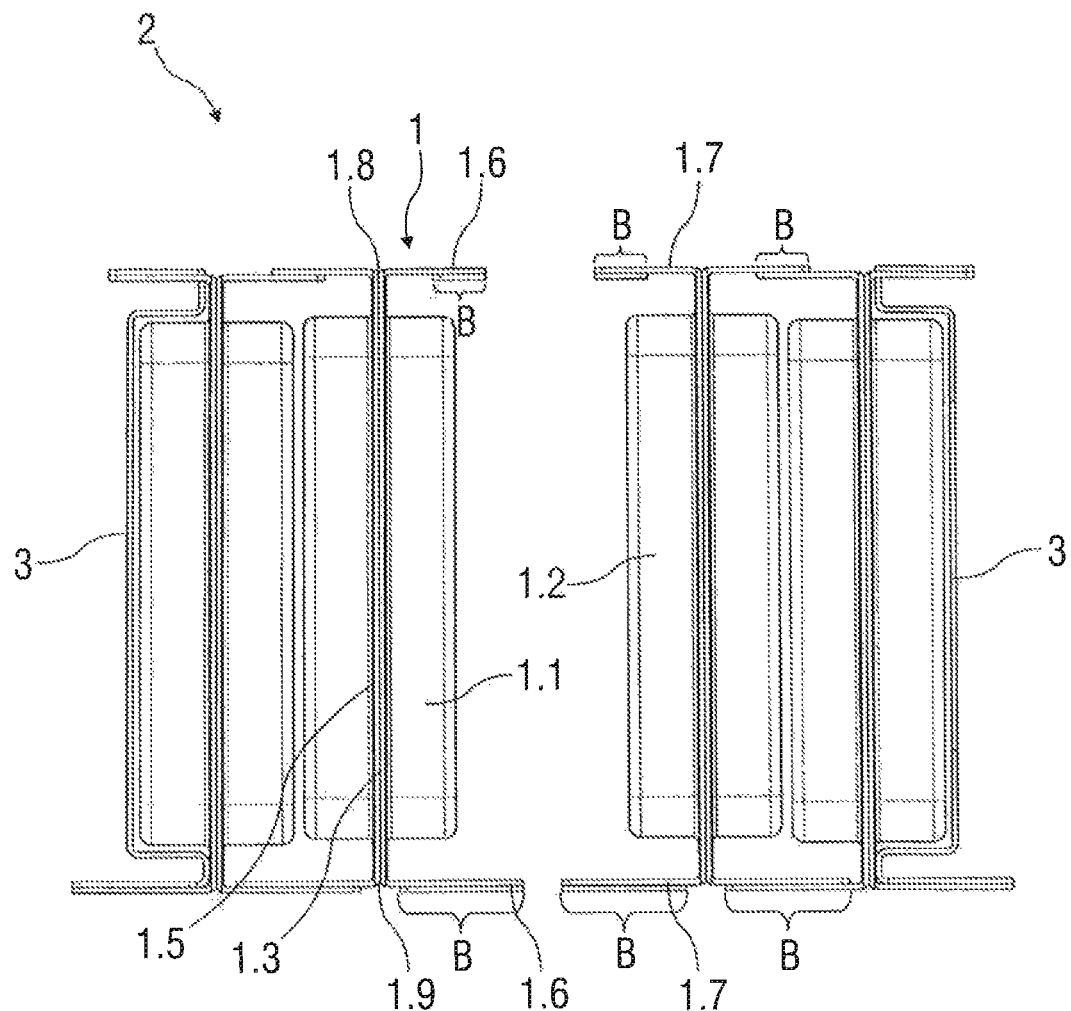

FIG. 6 shows the cell block 2 after the separation of the defective individual cell 1 in a perspective view. In FIG. 7, an enlarged section of the cell block 2 shown in FIG. 6 is depicted, wherein it can be recognized that the terminal contacts 1.6, 1.7 of the individual cells 1 adjacent to the defective individual cell 1 are respectively furthermore welded with a section of the terminal contacts 1.6, 1.7 which is detached from the defective individual cell 1. FIG. 8 shows the cell block 2 in a side view.

Figure 9:
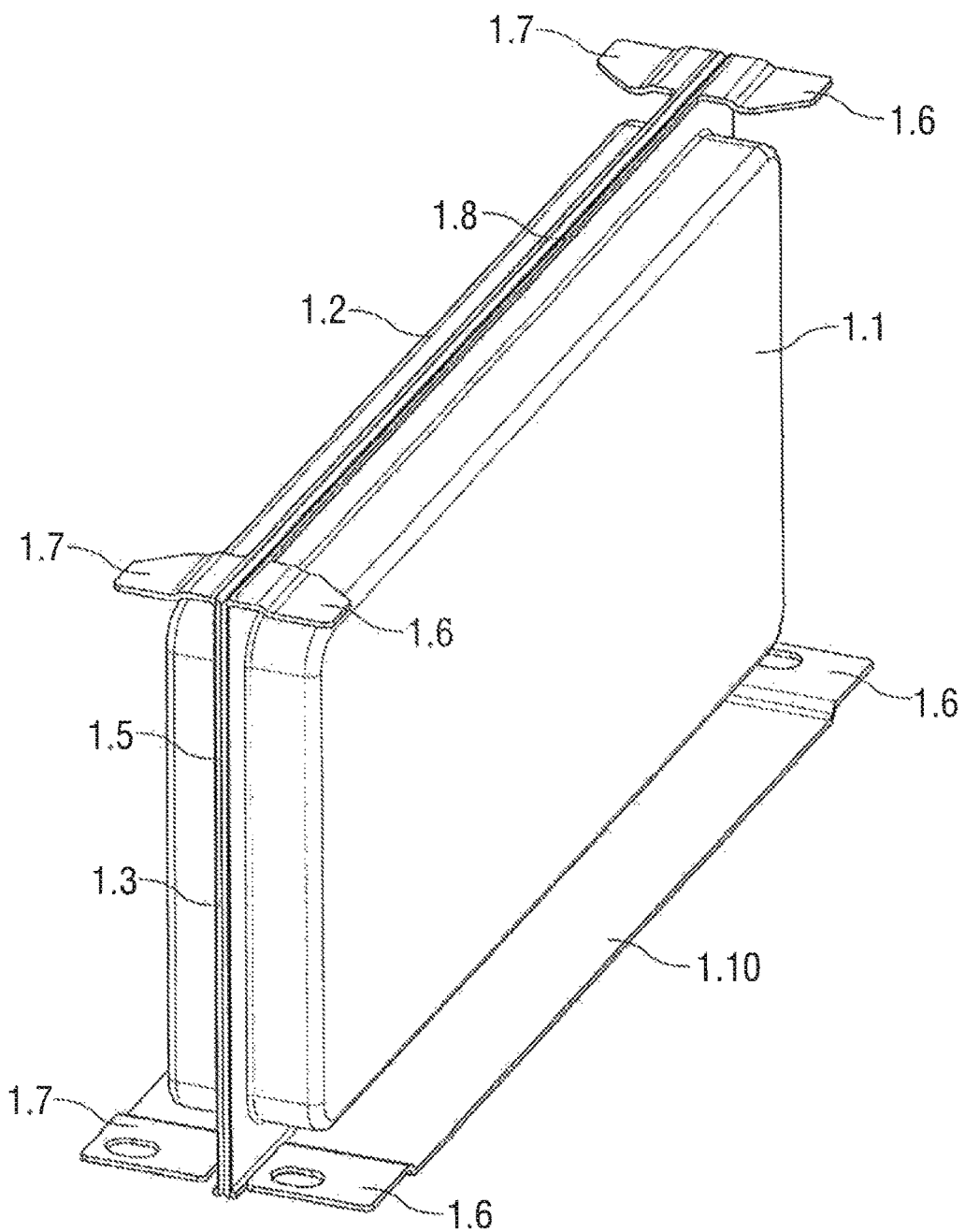

In FIG. 9, an individual cell 1 to be newly inserted into the cell block 2 is depicted perspectively, which replaces the defective, already disassembled individual cell 1. Here, the new individual cell 1 can also be understood to be a repaired individual cell 1.

The terminal contacts 1.6, 1.7 of the new individual cell 1 are formed differently from the terminal contacts 1.6, 1.7 of the defective individual cell 1 as well as the further, intact individual cells 1 arranged in the cell block 2.

The terminal contacts 1.6, 1.7 arranged on the upper side 1.8 of the new individual cell 1 are angled downwards in a roughly stepped manner with their free end with respect to an end arranged on the flange of the housing shell 1.1, 1.2 with regard to a vertical alignment.

The terminal contacts 1.6, 1.7 arranged on the lower side 1.9 of the new individual cell 1 are formed in one piece with the further partial piece 1.10 and are angled upwards in a roughly stepped manner with their free end with respect to the further partial piece 1.10 with regard to a vertical alignment.

Figure 10:
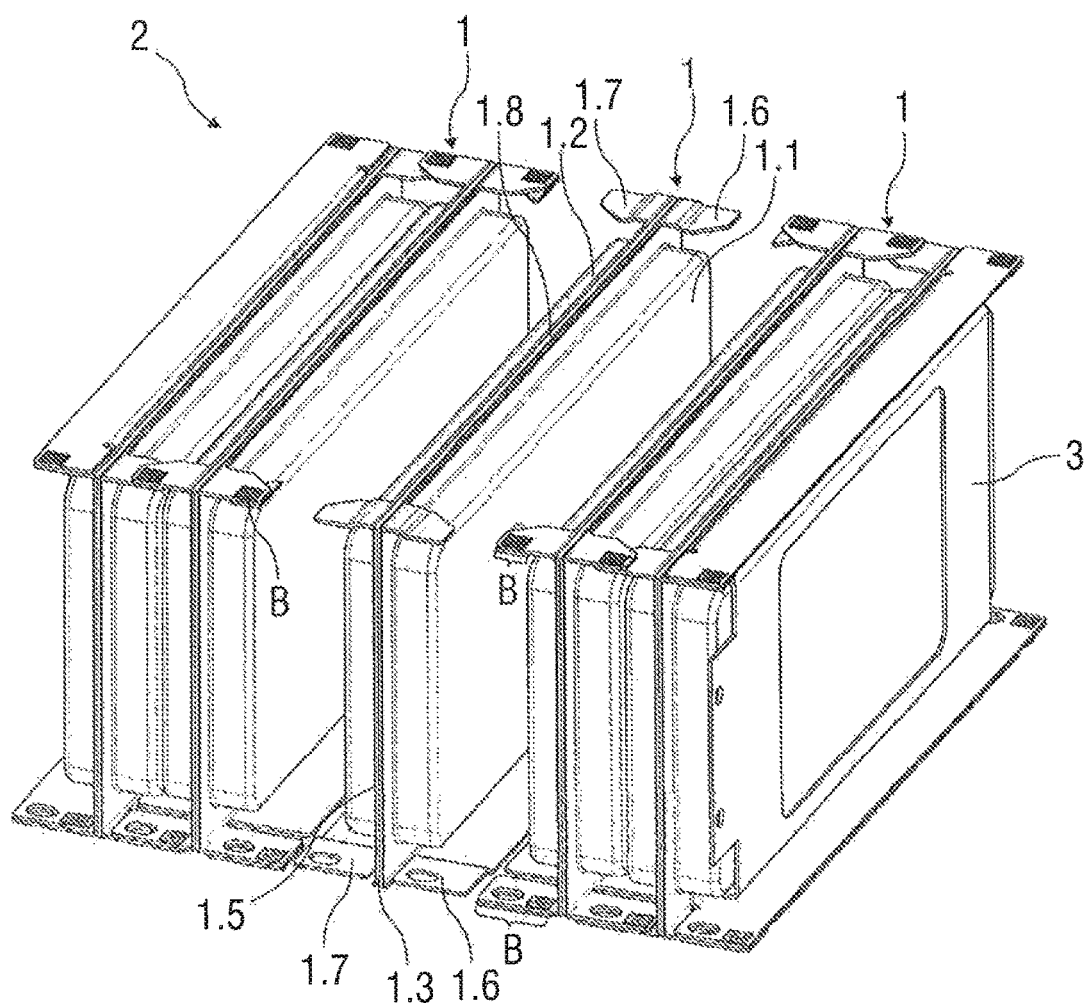
Figure 11:
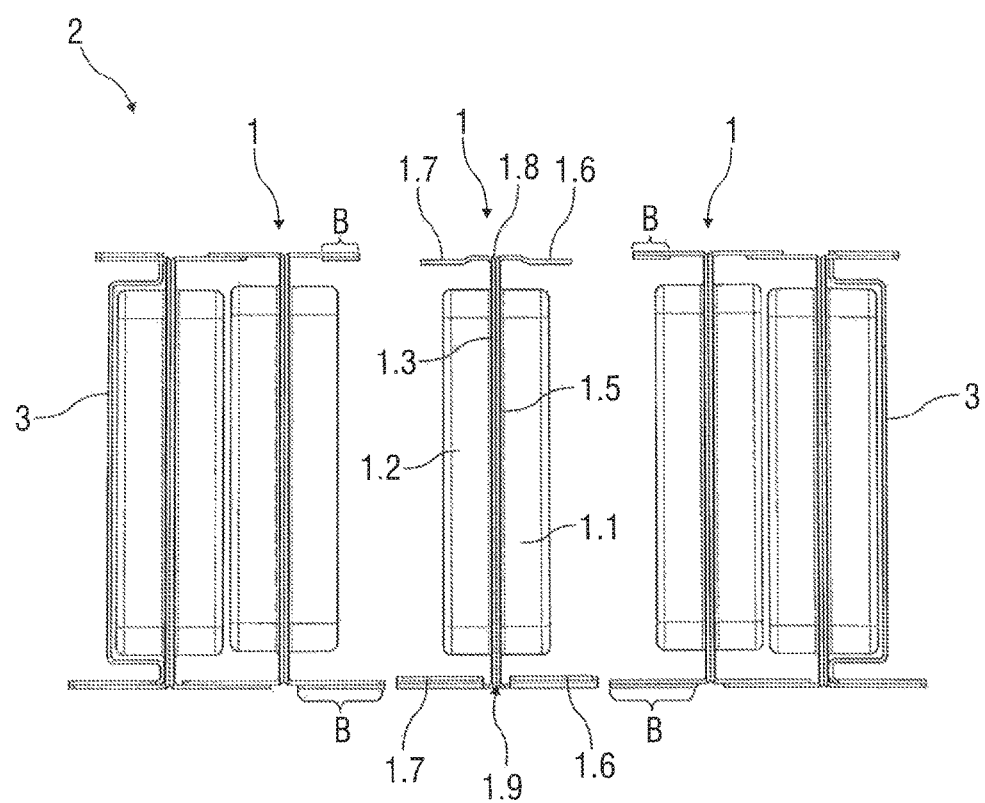

The arrangement of the new individual cell 1 in the cell block 2 is depicted perspectively in FIG. 10 and in a side view in FIG. 11. Here, a position of the terminal contacts 1.6, 1.7 of the new individual cell 1 which is offset to the terminal contacts 1.6, 1.7 of the individual cells arranged in the cell block 2 can be recognized in particular in the region of the free ends of the terminal contacts 1.6, 1.7.

FIG. 12 shows the cell block 2 having the new individual cell 1 in the assembled state, wherein this is welded to two individual cells 1 by means of the welding tool 5.

The terminal contacts 1.6, 1.7 arranged on the upper side 1.8 of the new individual cell 1 are here arranged with respectively one angled, free end below the overlapping region B of the respectively adjacent individual cell 1 in the vertical alignment.

The terminal contacts 1.6, 1.7 arranged on the lower side 1.9 of the new individual cell 1 are arranged with respectively one angled, free end above the overlapping region B of the respectively adjacent individual cell 1 in the vertical alignment. In other words: the terminal contacts 1.6, 1.7 of the new individual cell 1 are, in the assembled state of the cell block 1, arranged to be offset to the terminal contacts 1.6, 1.7 of the adjacent individual cell 1 by respectively two material thicknesses of a terminal contact 1.6, 1.7.

For welding the new individual cell 1 to the adjacent individual cells 1, in the present exemplary embodiment, a second terminal contact 1.7 arranged on the lower side 1.9 of the new individual cell 1 and a first terminal contact 1.6 arranged on the lower side 1.9 of the adjacent individual cell 1 are arranged between the sonotrode 5.1 and the anvil 5.2 and are connected to each other firmly by the sonotrode 5.1, such that a new overlapping region B1 is produced. This is continued for all further terminal contacts 1.6, 1.7 of the new individual cell 1. The new overlapping region B1 therefore has the terminal contact 1.6, 1.7 of the adjacent individual cell 1, the detached section of the terminal contact 1.6, 1.7 of the defective individual cell 1 and the terminal contact 1.6, 1.7 of the new individual cell 1.

Figure 13:
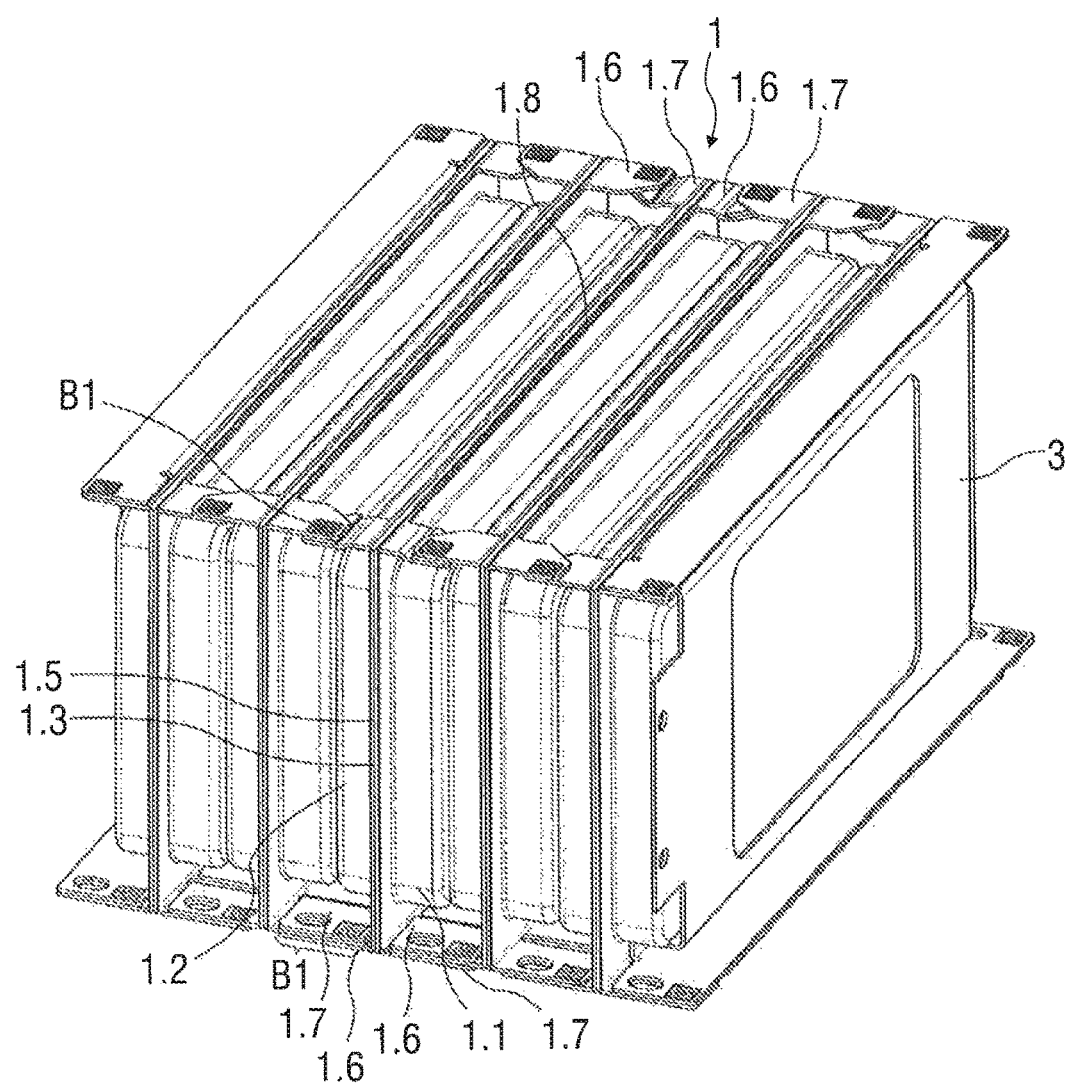
Figure 14:
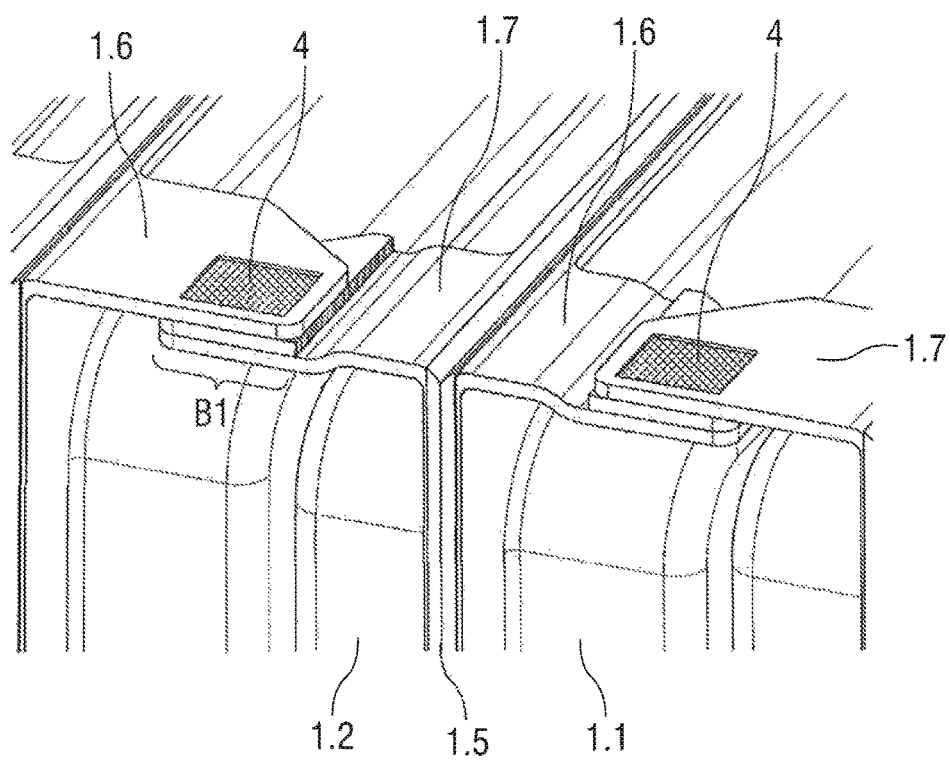
Figure 15:
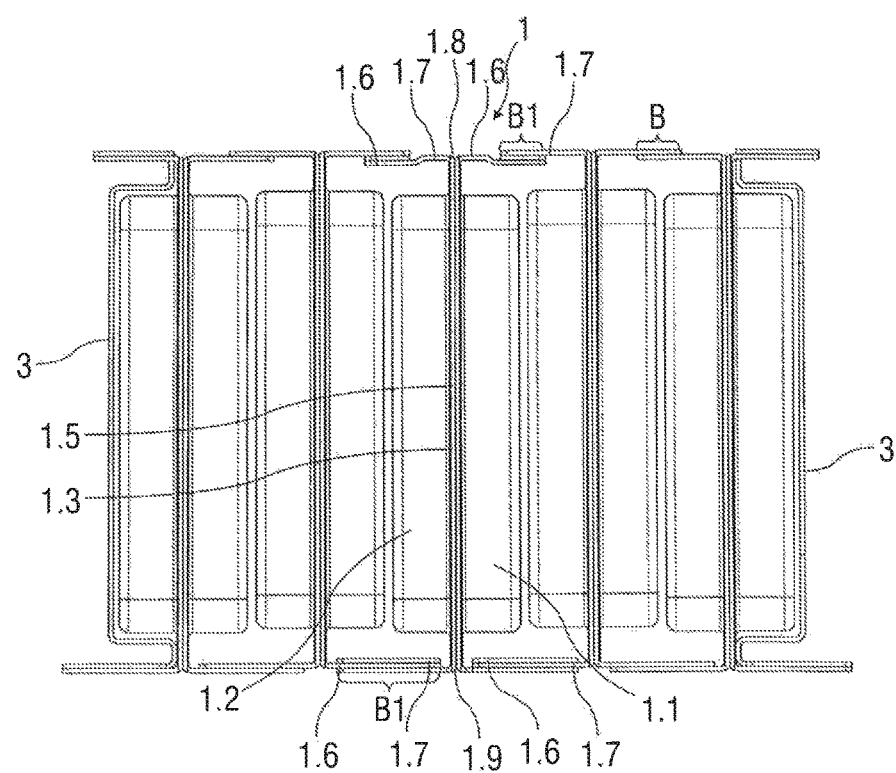

In FIGS. 13 to 15, the cell block 2 with the new, welded individual cell 1 is in the assembled state. Here, FIG. 13 shows the cell block 2 perspectively, FIG. 14 shows an enlarged section of the cell block 2 shown in FIG. 13 and FIG. 15 shows the cell block 2 according to FIG. 13 in a side view.

In FIGS. 16 to 25, a second embodiment of the invention is depicted and described in more detail, in which the individual cells 1 are formed as pouch cells.

Figure 16:
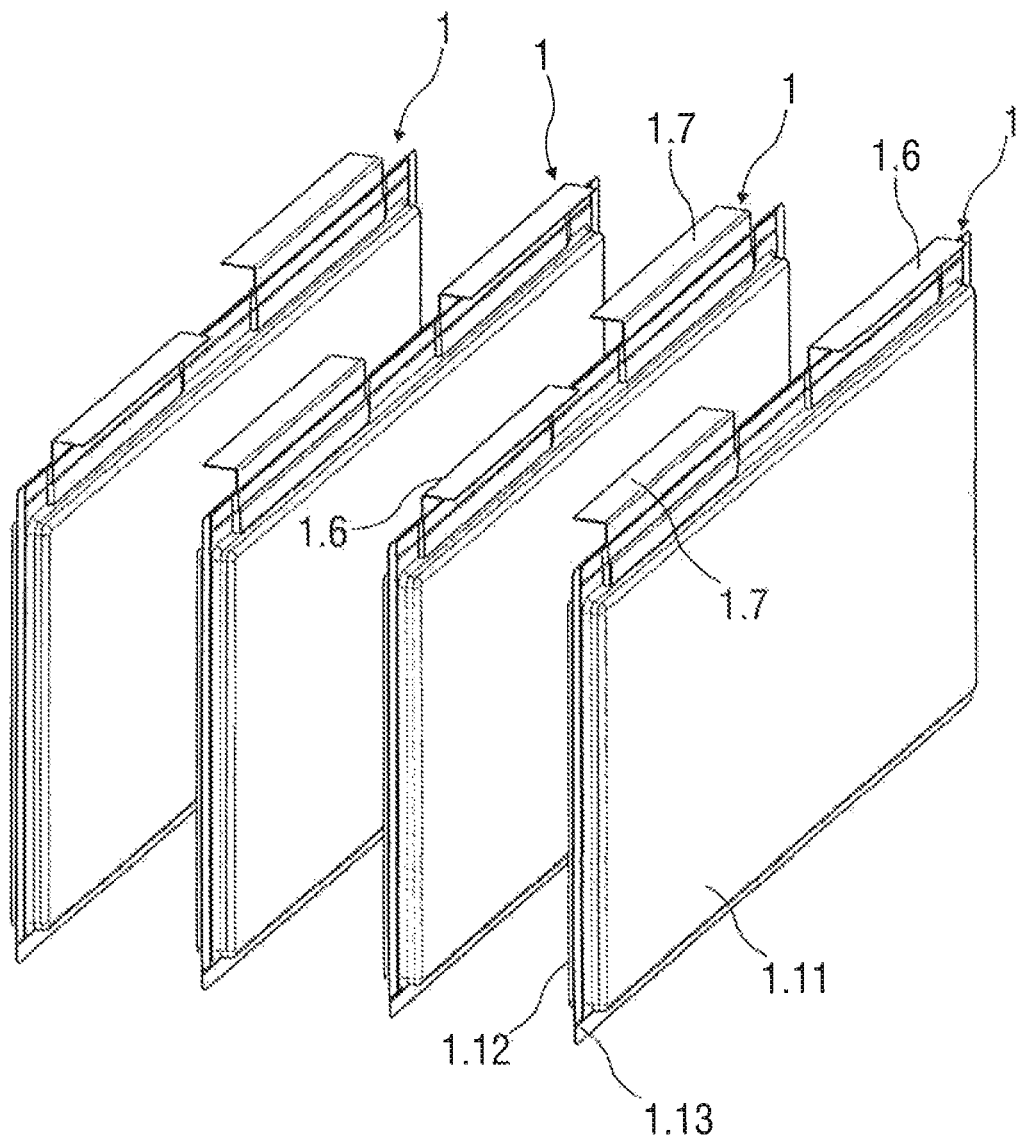
Figure 17:
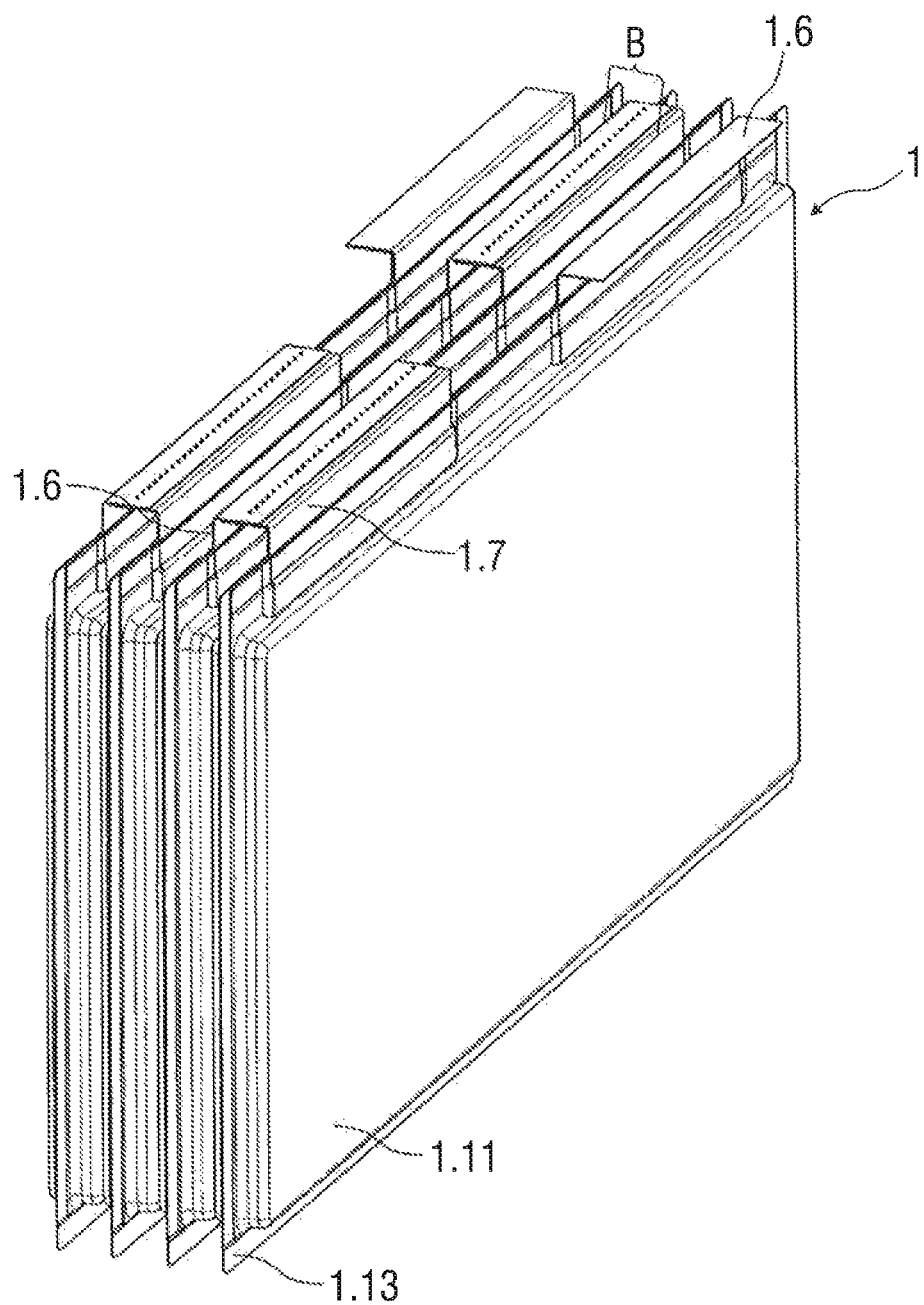
Figure 18:
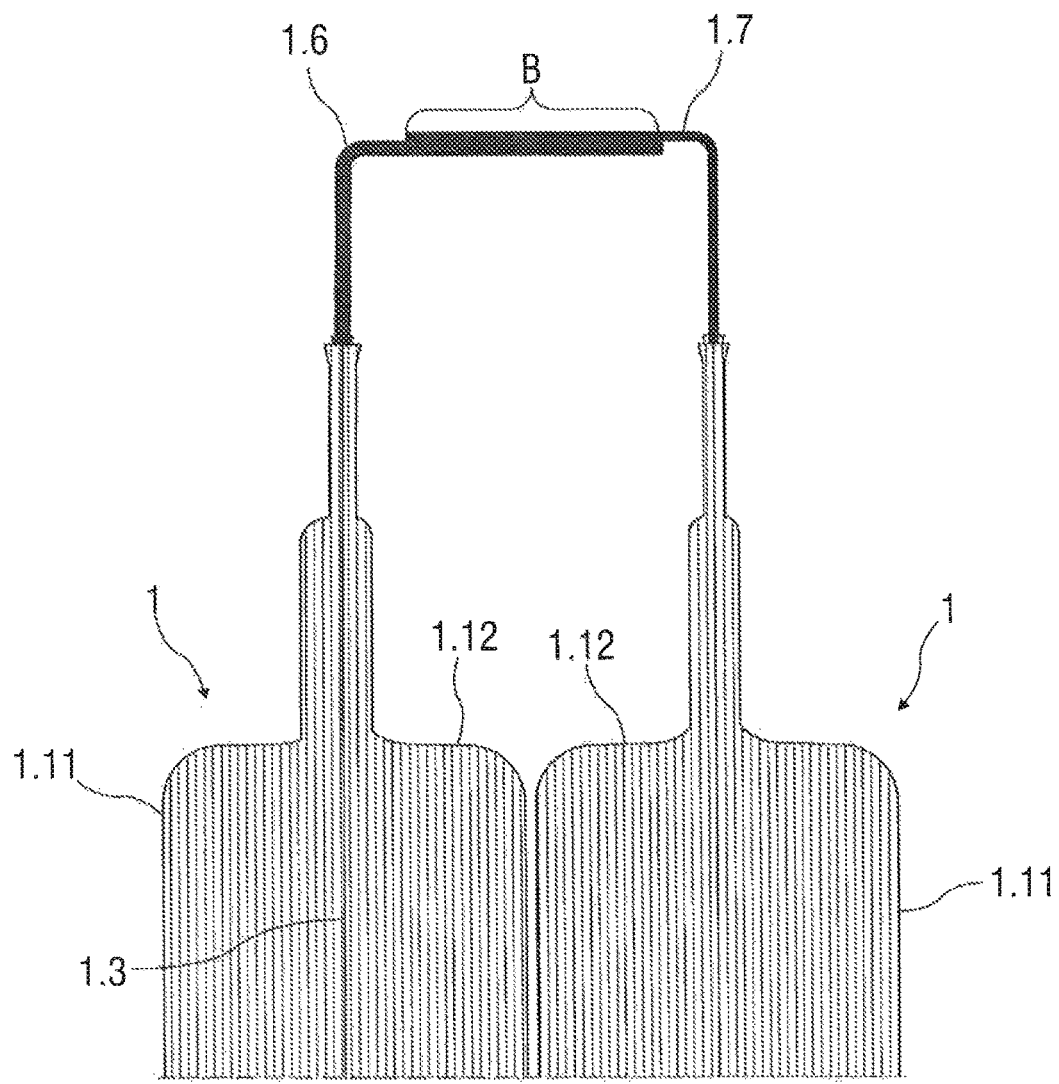

The individual cells 1 are depicted in more detail in FIGS. 16 to 18, among others, wherein FIGS. 16 and 17 depict these perspectively and FIG. 18 depicts two individual cells 1 arranged adjacently in the cell block 2 in a cross-sectional depiction, in particular in cross-section.

In the case of individual cells 1 formed as pouch cells, the electrode foil arrangement 1.3 is surrounded by a foil-type packaging. The packaging is formed from two foil sections, 1.11, 1.12 arranged one over the other, which are connected firmly to each other in the overlapping edge region, for example by means of a hot pressing method, wherein a sealing seam 1.13 is formed.

On one side of the individual cell 1, the electrical terminal contacts 1.6, 1.7 thereof are guided out of the packaging as connections in a sheet metal shape.

The electrical series connection of the individual cells 1 occurs by direct connection, in particular by means of laser welding, of the terminal contacts 1.6, 1.7 of adjacent individual cells 1 which are bent towards one another, whereby an overlapping region B is formed, in which the individual cells 1 are welded to one another using welding seams, as is depicted in FIG. 17 by means of dotted lines. Alternatively, the individual cells 1 are able to be connected to one another by means of separate cell connectors 1.14 which connect the terminal contacts 1.6, 1.7 of adjacent individual cells 1 to one another.

To exchange a defective individual cell 1, the terminal contacts 1.6, 1.7 thereof are separated directly next to the respective overlapping region B. The separating points are depicted in FIG. 19 by means of second intersecting lines S2.

The separation of the defective individual cell 1 can, in an equivalent way to the individual cells 1 formed as flat-cell frames, occur by means of a mechanical method with tool contact, such as, for example, sheet cutting, grinding, milling, sawing, or by means of contactless methods, such as, for example, laser cutting, water jet cutting, micro flame cutting.

Also, it is additionally also possible here to provide the terminal contacts 1.6, 1.7 of the individual cells 1 with target break points, for example in the form of a notch, in order to facilitate a separation of the defective individual cell 1.

Figure 19:
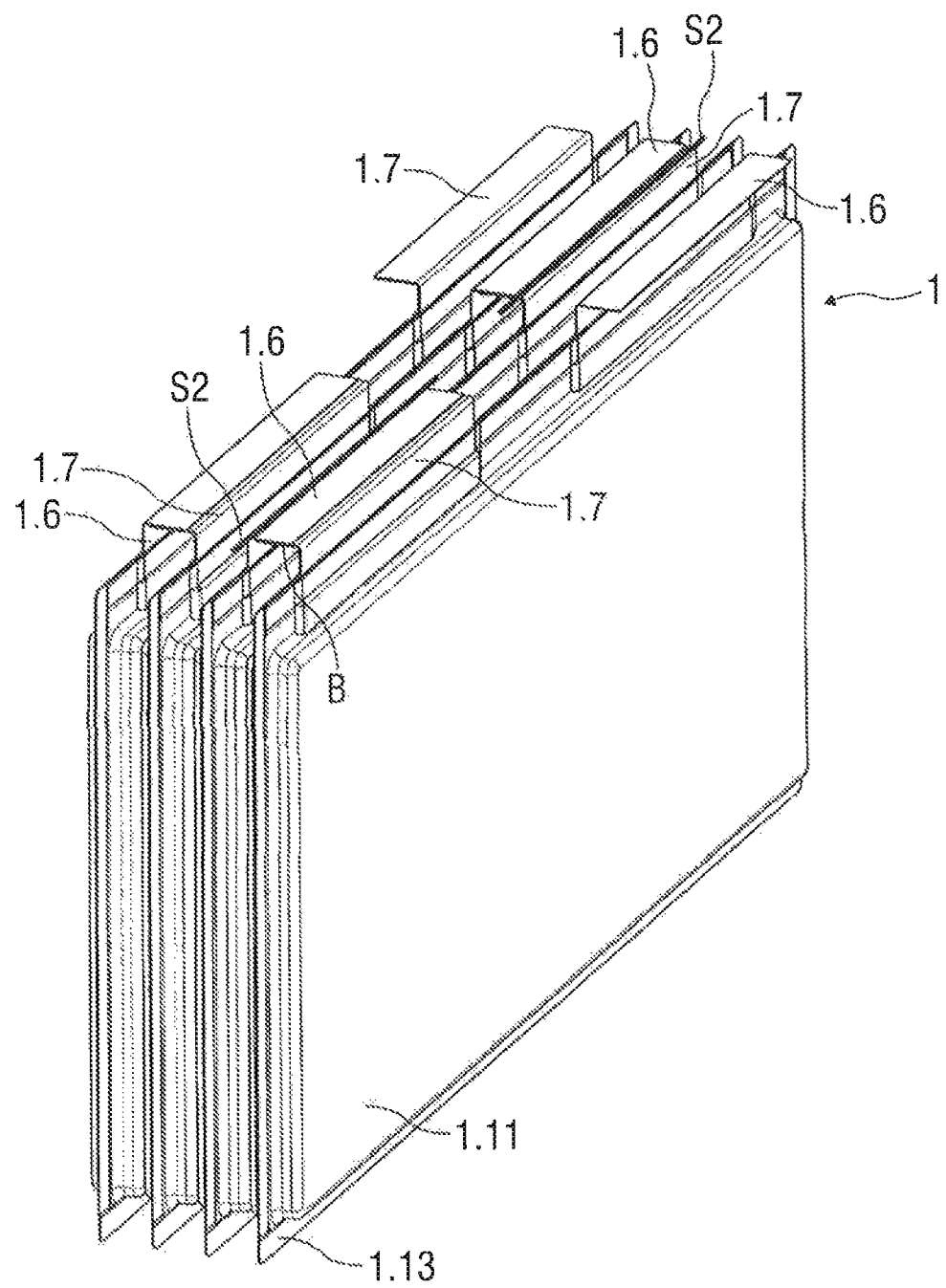
Figure 20:
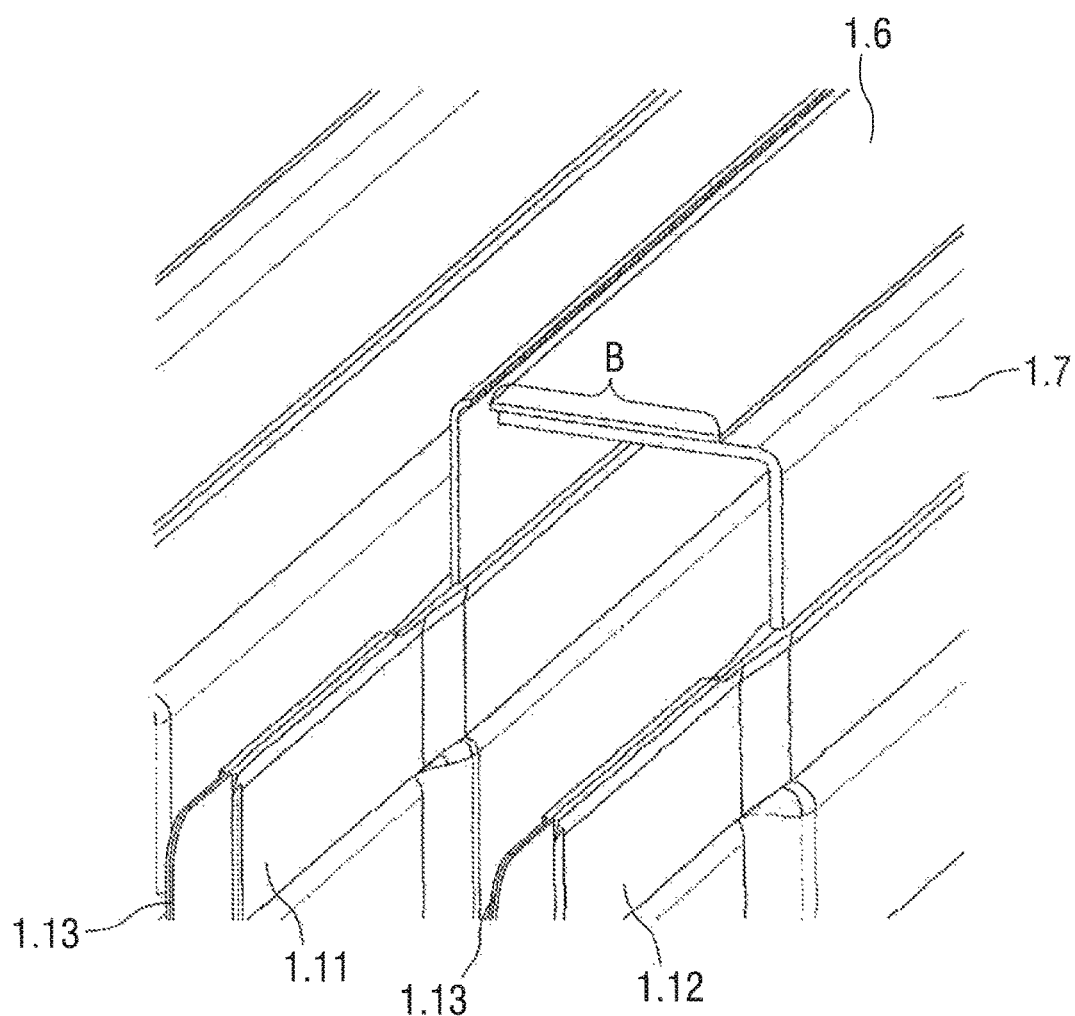

FIG. 19 shows the individual cells 1 arranged one next to the other with the defective individual cell 1, wherein the terminal contact 1.6, 1.7 thereof has been separated at the second intersecting lines S2 by means of one of the methods described above. This is depicted in more detail in FIG. 20 which shows an enlarged section from FIG. 19.

Figure 21:
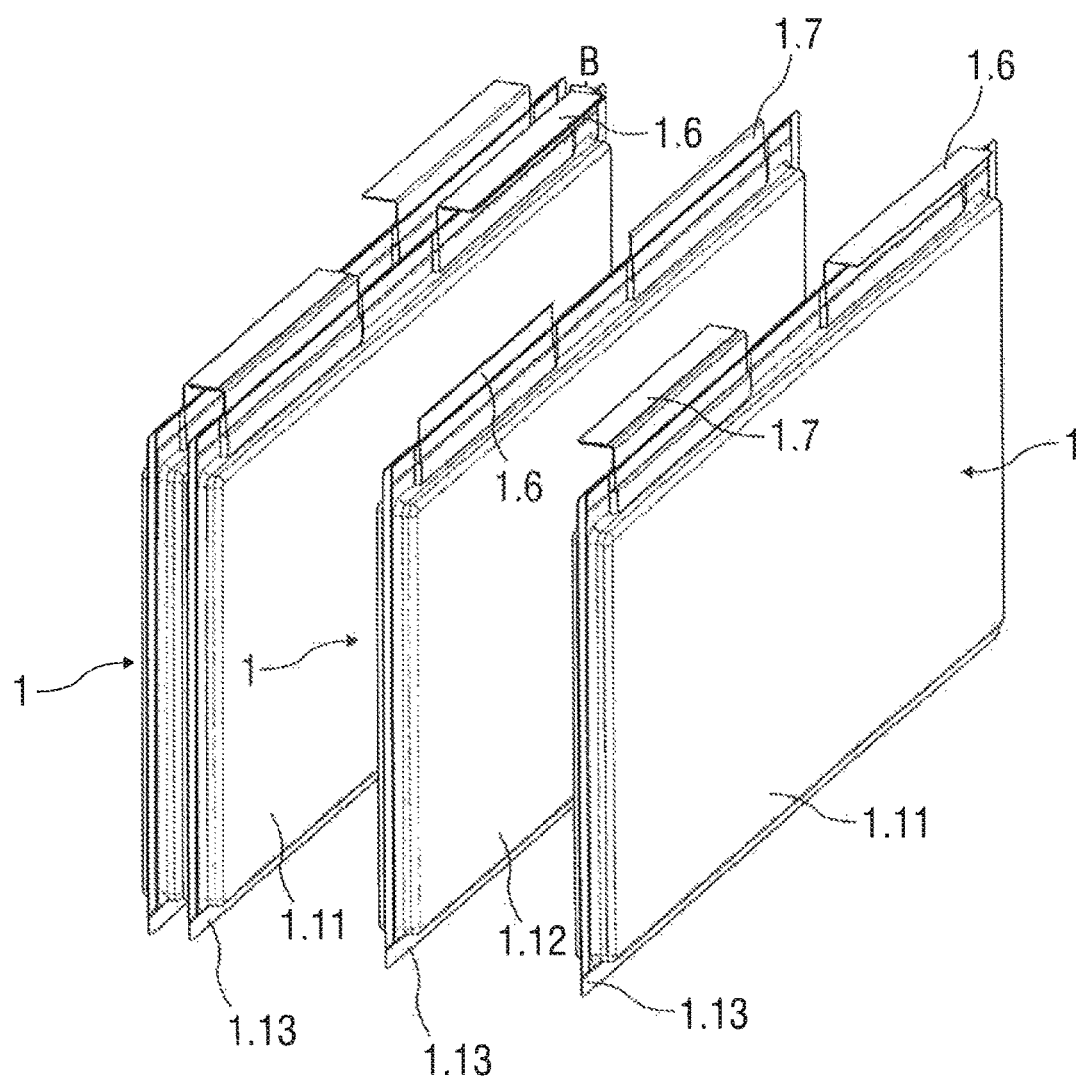

FIG. 21 shows the individual cells 1 arranged one next to the other having the separated terminal contacts 1.6, 1.7 of the defective individual cells 1 in a partially exploded depiction.

Figure 22:
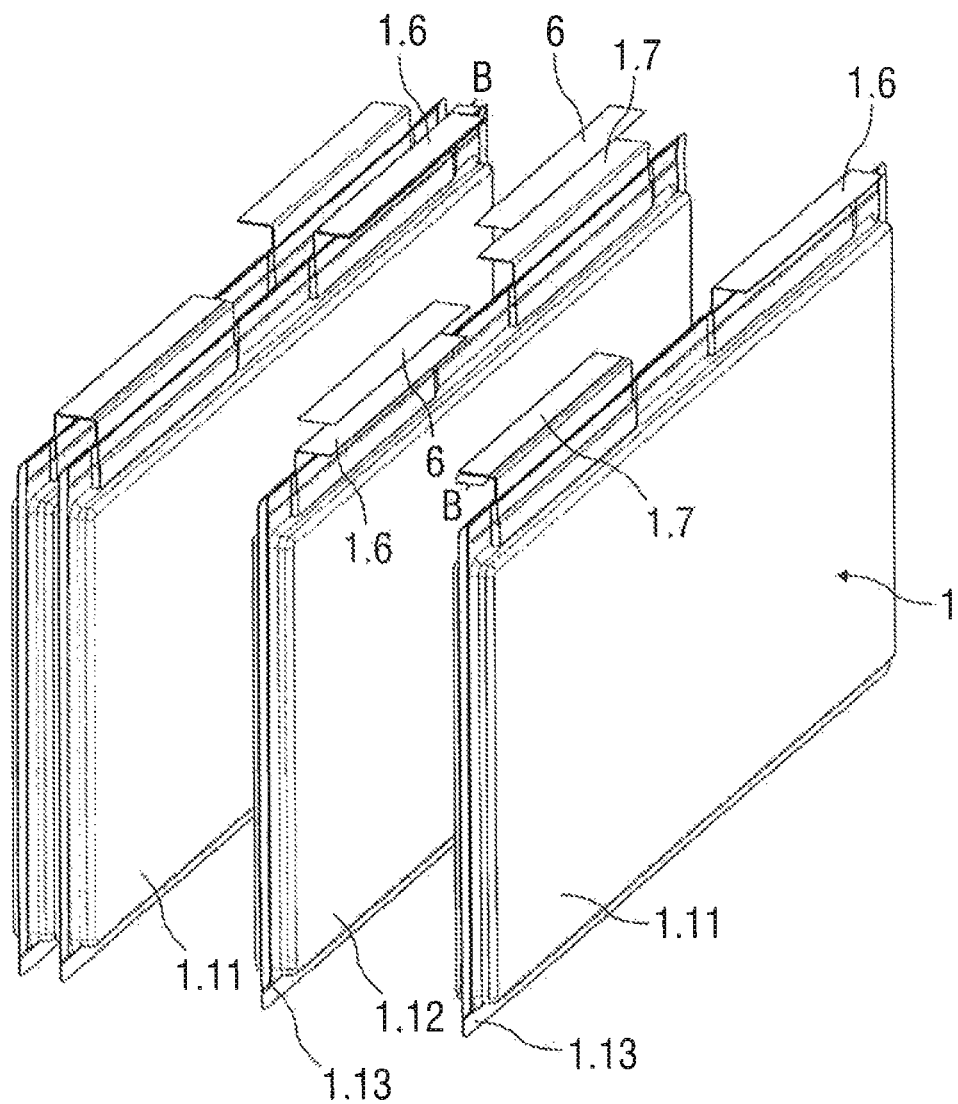

In FIG. 22, the individual cells 1 arranged one next to the other are depicted perspectively having an individual cell 1 newly inserted into the cell block 2, which replaces the defective, already disassembled individual cell 1.

The terminal contacts 1.6, 1.7 of the new individual cell 1 are formed differently with respect to the terminal contacts 1.6, 1.7 of the defective individual cell 1 as well as the further, intact individual cells 1 arranged in the cell block 2, in particular a spacing between the angled section of the respective terminal contact 1.6, 1.7 and a cell upper edge on which the terminal contact 1.6, 1.7 projects over the individual cell 1 is smaller.

Therefore, the angled sections of the terminal contacts 1.6, 1.7 of the new individual cell 1 can be arranged, with regard to the vertical alignment of the individual cell 1, below the respective overlapping region B of the adjacent individual cell 1 and therefore form a new overlapping region B. The new overlapping region B therefore has the terminal contact 1.6, 1.7 of the adjacent individual cell 1, the detached section of the terminal contact 1.6, 1.7 of the defective individual cell 1 and the terminal contact 1.6, 1.7 of the new individual cell 1.

For the firm connection of the new overlapping region B, preferably a cold soldering method with so called soldered sheets 6, also referred to as solder pads, is used. The soldered sheets 6 are formed roughly identically in their length and width to the overlapping region B and are arranged directly on the overlapping region B.

A soldered sheet 6 is formed from an exothermically reactive material as a heat source and a solder foil having a soft solder, such as, for example, tin-based solder, tin, tin-silver solder, tin-silver-copper solder, or with a hard solder, such as, for example, Incusil. Here, the soldered sheet 6 is connected to the overlapping region B after an external activation, for example a short current pulse or a partial heating, by an exothermic reaction of the material. Preferably, electrical energy of the cell block 2 can be used as a current pulse, wherein this is connected to a resistor after compression of the individual cells 1 and arrangement of the soldered sheet 6 on the overlapping regions B, such that a specific current flows which serves for the previously described activation of the soldered sheet.

Figure 23:
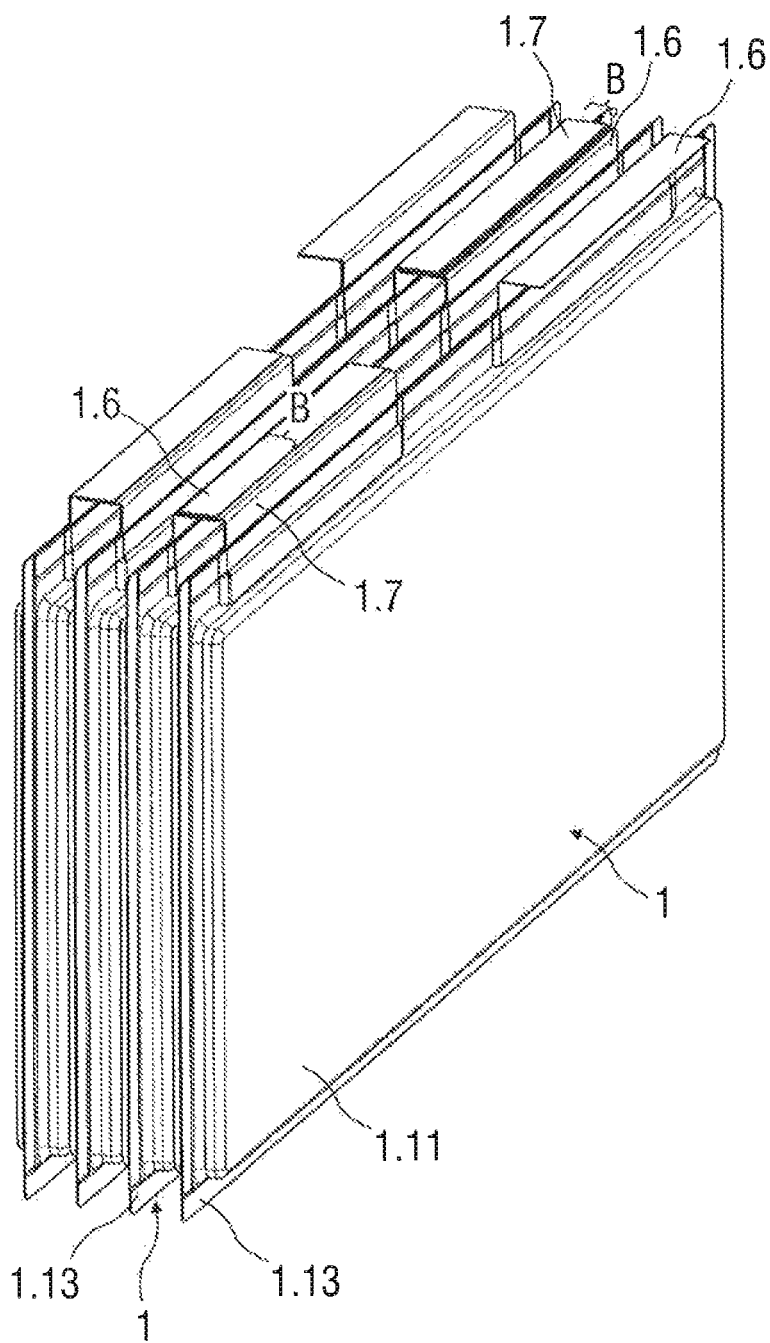
Figure 24:
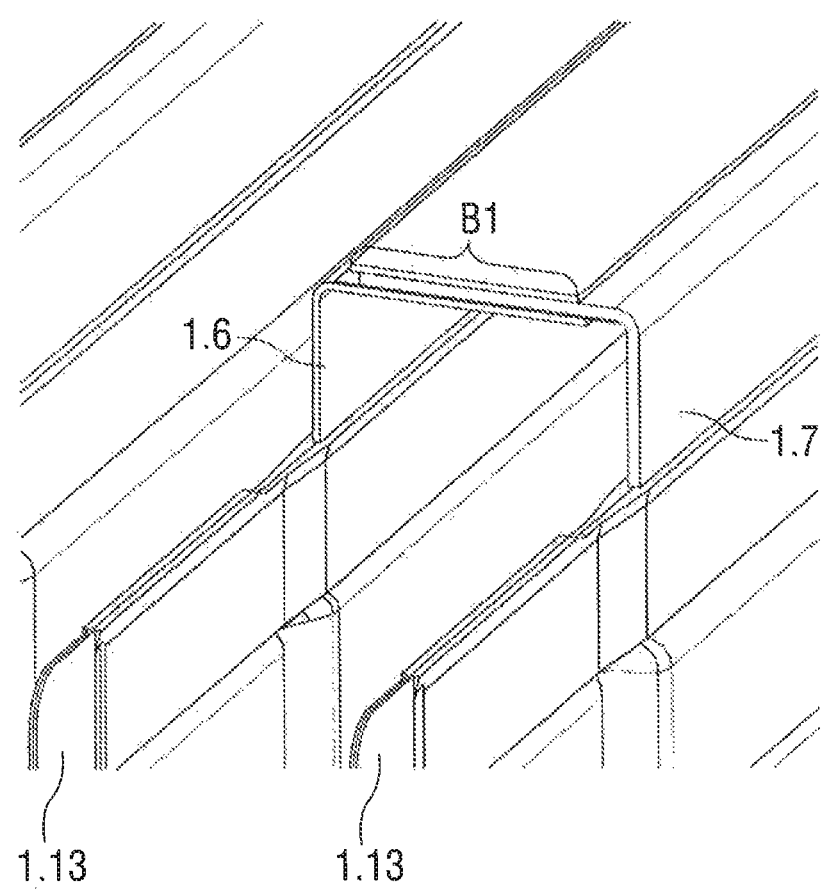
Figure 25:
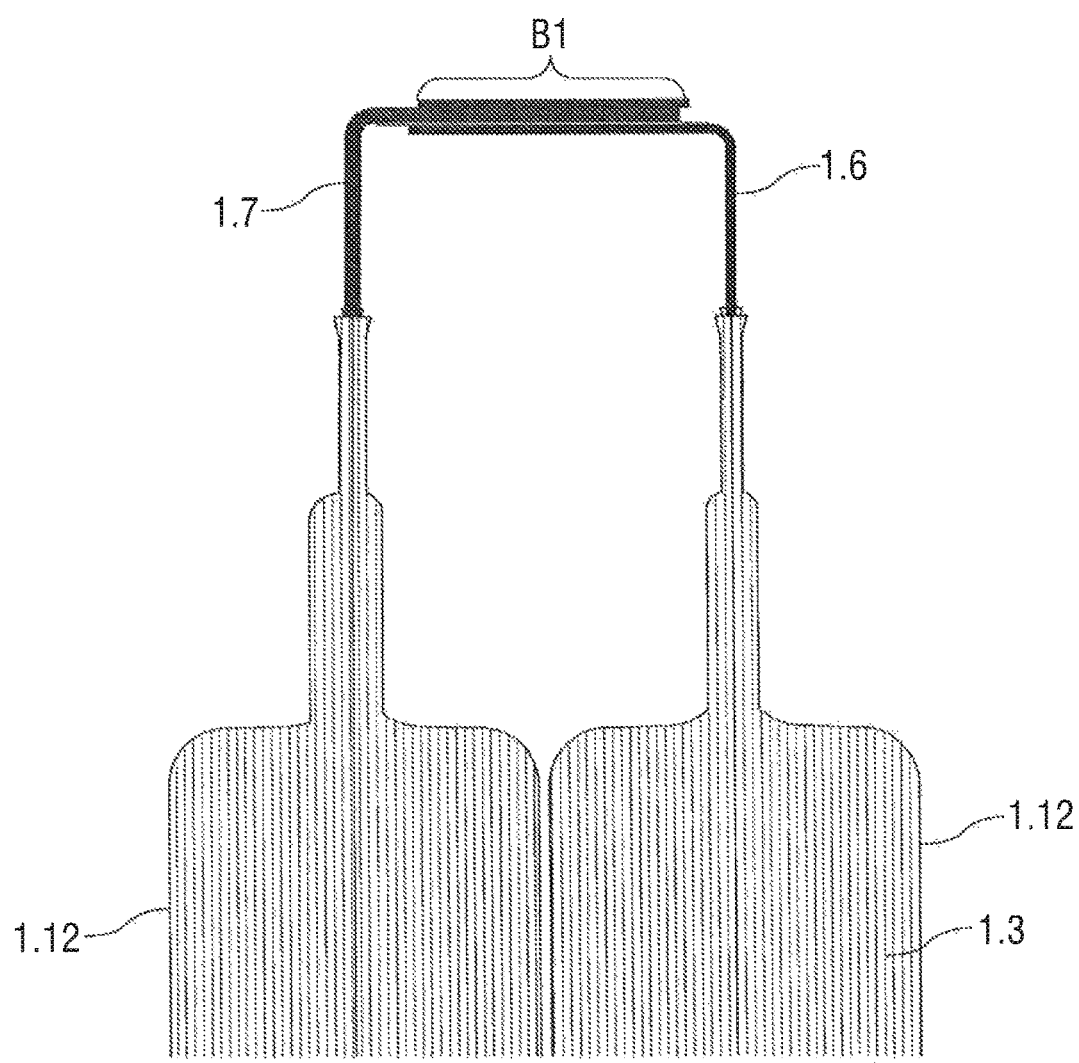

In FIGS. 23 to 25, the individual cells 1 are depicted arranged one next to the other having the newly inserted individual cell 1 which replaces the defective, already disassembled individual cell 1. Here, FIG. 23 shows the individual cells 1 perspectively. FIG. 24 shows an enlarged section from FIG. 23. In FIG. 25, an enlarged section of an individual cell 1 is depicted in a cross-sectional depiction, in particular in cross-section, which is connected firmly to the new individual cell 1.

In FIGS. 26 to 30, a third embodiment of the invention is depicted in more detail in which a battery monitoring unit 7 is exchanged on a cell block 2 with individual cells 1 held in frame elements 8 and formed as pouch cells.

Figure 26:
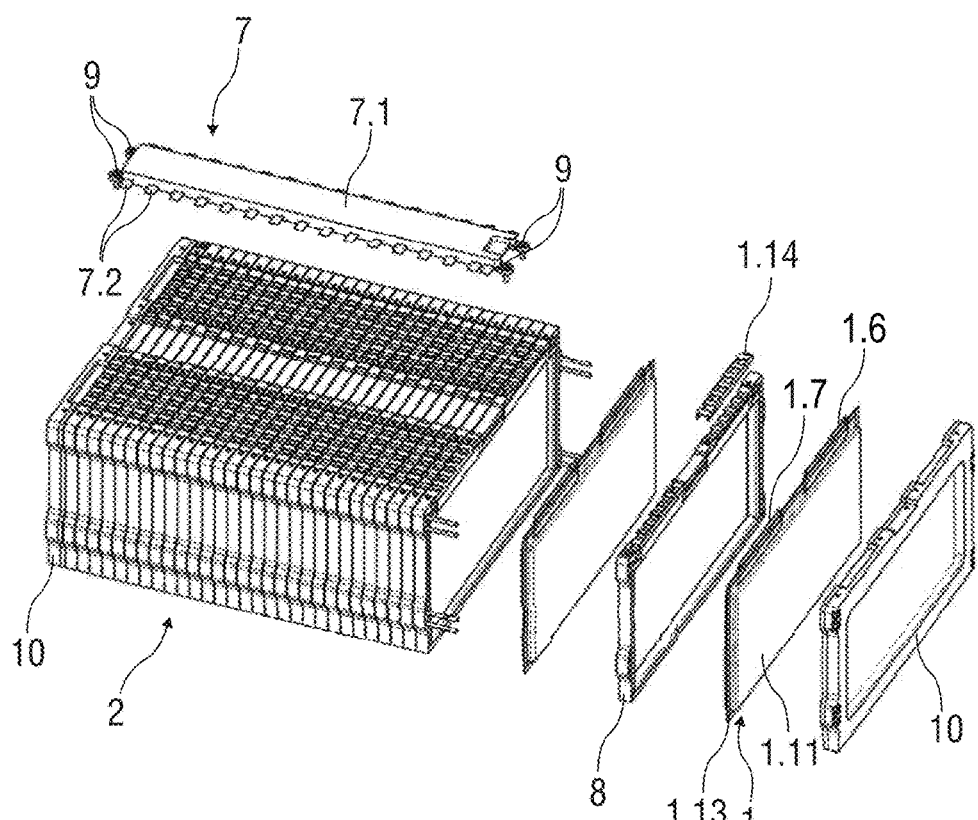
Figure 27:
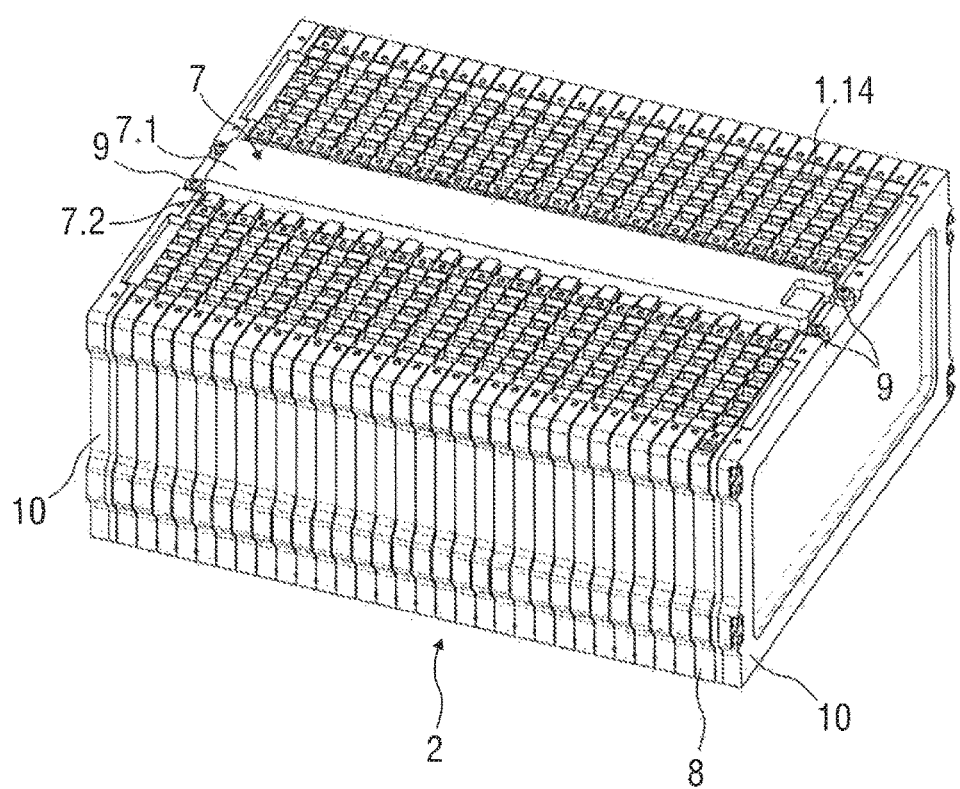

For this purpose, FIG. 26 shows, perspectively, a cell block 2 having a battery monitoring unit 7 in a partially exploded depiction. FIG. 27 shows the cell block 2 in the assembled state.

The battery monitoring unit 7 has an electronic system which is not depicted in more detail and which is arranged in a battery monitoring housing 7.1, wherein the battery monitoring unit 7 serves for the cell voltage measurement and for voltage compensation between the individual cells 1 of the cell block 2. For this purpose, the battery monitoring unit 7 is coupled directly or indirectly to each individual cell 1 of the cell block 2.

The battery monitoring unit 7 is, with regard to an upper side of the cell block 2, arranged centrally in the longitudinal extension thereof and connected to the individual cells 1 via connection elements 7.2. For this purpose, the battery monitoring unit 7 has a predeterminable number of bar or tongue-shaped connection elements 7.2, wherein a number of connection elements 7.2 is arranged or formed on each side of the battery monitoring unit 7 and these respectively project in the transverse extension of the cell block 2 from the battery monitoring housing 7.1.

A connection element 7.2 of the battery monitoring unit 7 is here allocated to two adjacent individual cells 1, wherein the respective connection element 7.2 is firmly fastened in sections to a cell connector 1.14, in which a section of the connection element 7.2 is arranged on the cell connector 1.14, whereby an overlapping region B is formed. The connection element 7.2 is subsequently connected to the cell connector 1.14 in the overlapping region B by spot welding or laser welding or soldering. Additionally, the battery monitoring unit 7 is able to be fastened in a non-positive manner by means of fastening elements 9 to the cell block 2 respectively on the front side final pressure plates 10.

Figure 28:
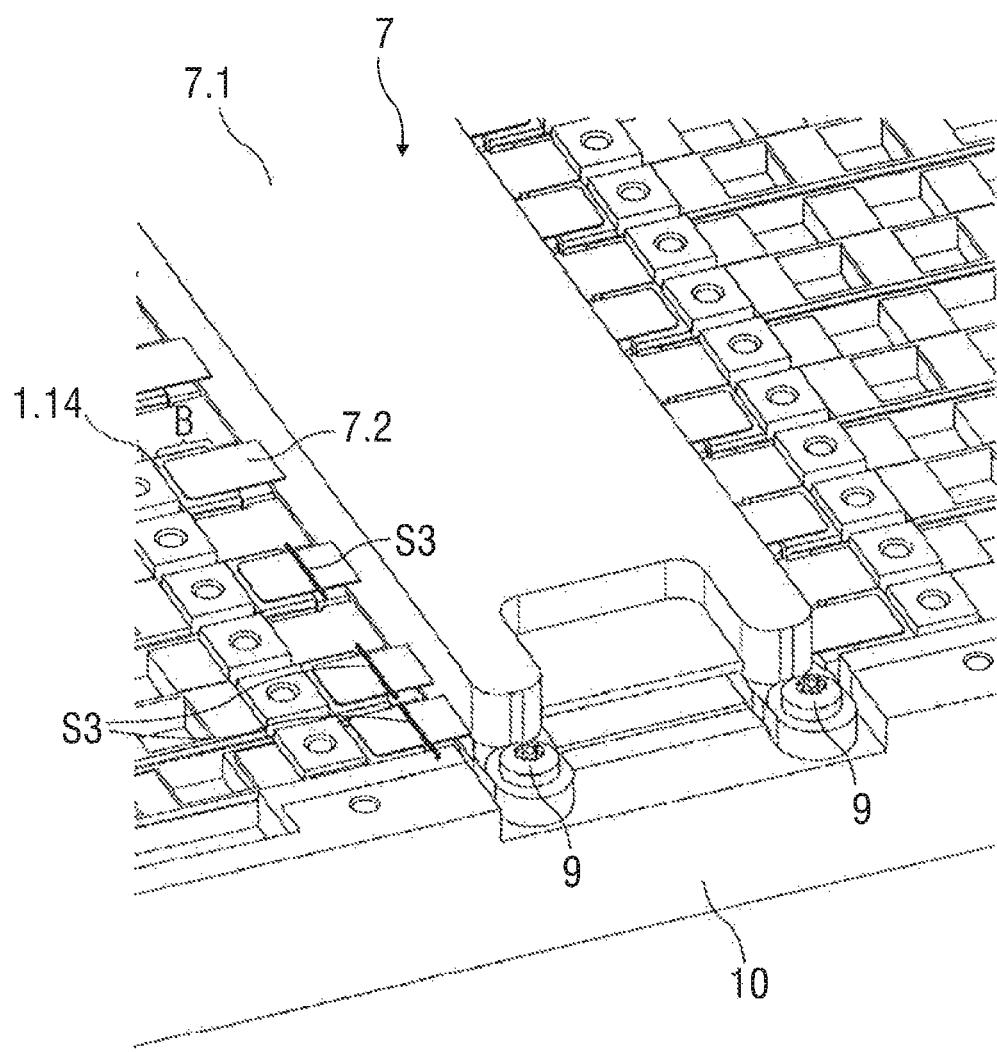

To remove the battery monitoring unit 7, the connection elements 7.2 are respectively separated directly next to the overlapping region B by means of a method described in the first or second embodiment of the invention, as is depicted in FIG. 28 by means of third intersecting lines S3. FIG. 28 here shows an enlarged section of the cell block 2 depicted in FIG. 27 perspectively, wherein the battery monitoring unit 7 is depicted in a front side in more detail.

Figure 29:
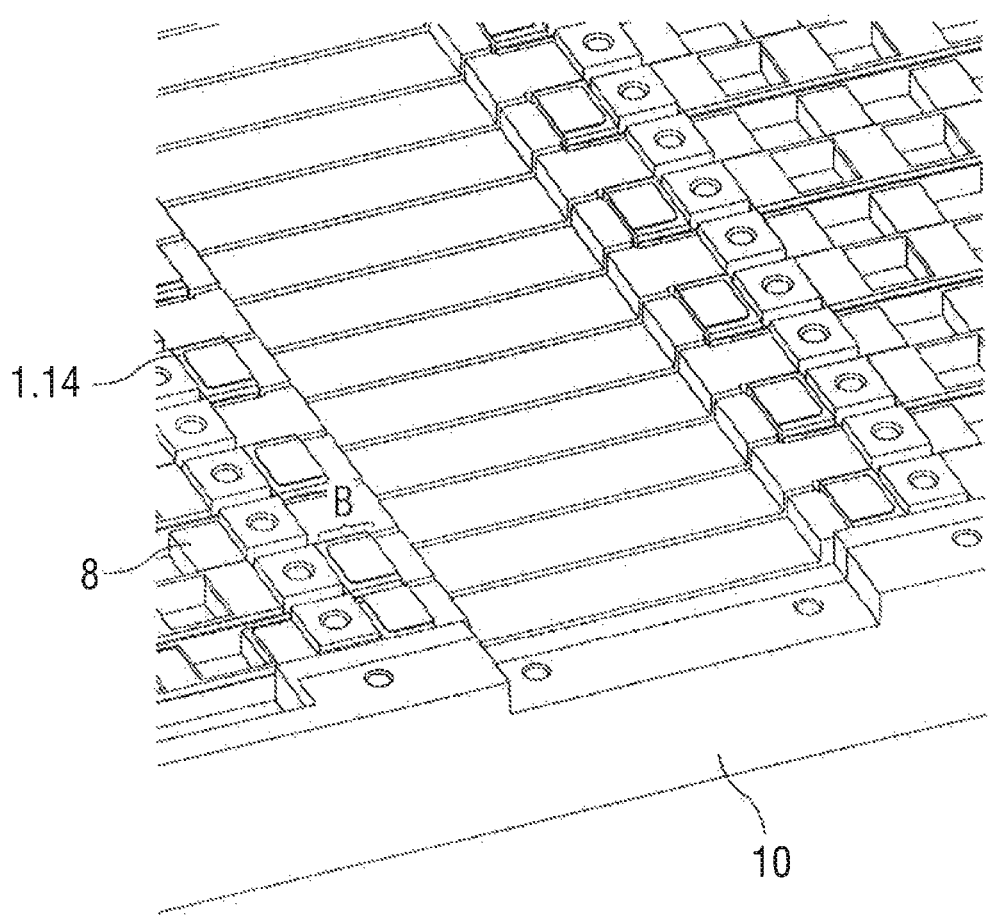

FIG. 29 shows the enlarged section according to FIG. 28 with a separated battery monitoring unit 7. Here, in particular, the overlapping region B can be recognized, which remains on the cell connectors 1.14 after the separation of the battery monitoring unit 7.

Figure 30:
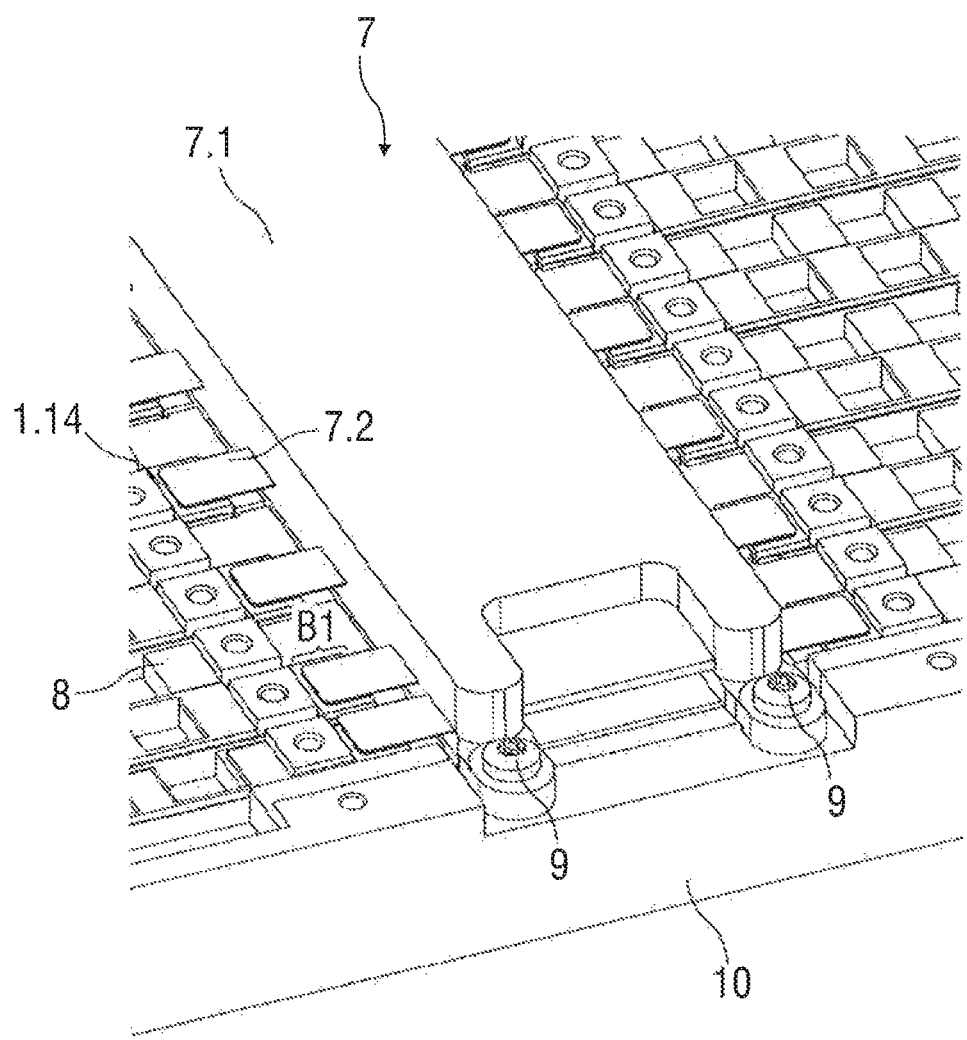

If a new or repaired battery monitoring unit 7 is again arranged on the cell block 2, as is shown in FIG. 30, for the firm fastening to the cell connectors 1.14, the connection elements 7.2 of the battery monitoring unit 7, these are arranged in sections on the overlapping region B such that a new overlapping region B1 is formed, which has a section of the cell connector 1.14, the detached section of the connection element 7.2 of the disassembled battery monitoring unit 7 as well as a section of the connection element 7.2 of the new battery monitoring unit 7. For this purpose, a section, in particular a free end of the connection element 7.2 of the new battery monitoring unit 7, is slightly angled.

The firm connection is able to be achieved by means of the cold soldering method described in the second embodiment of the invention.

In FIG. 30, a firm fastening of the connection elements 7.2 of the battery unit 7 to the cell connectors 1.14, carried out by means of the cold soldering method, is depicted perspectively in an enlarged section.

LIST OF REFERENCE NUMERALS 1 individual cell
1.1 first housing shell
1.2 second housing shell
1.3 electrode foil arrangement
1.4 frame
1.5 sealing flange
1.6 first terminal contact
1.7 second terminal contact
1.8 upper side
1.9 lower side
1.10 further partial piece
1.11 first foil section
1.12 second foil section
1.13 sealing seam
1.14 cell connector
2 cell block
3 electrical connection element
4 welding point
5 welding tool
5.1 sonotrode
5.2 anvil
6 soldered sheet
7 battery monitoring unit
7.1 battery monitoring housing
7.2 connection elements
8 frame element
9 fastening elements
10 pressure plates B overlapping region
B1 new overlapping region
S1 first intersecting lines
S2 second intersecting lines
S3 third intersecting lines

The invention claimed is:

1. A method for maintenance, repair and/or optimization of a battery, which has, as components, a plurality of individual cells connected to one another in series and/or in parallel, having electrical terminal contacts which are connected to one another positively and/or firmly for electrical connection, directly or by cell connectors, forming an overlapping region, and/or a battery monitoring unit having a plurality of connection elements which are positively and/or firmly connected to the electrical terminal contacts and/or to the cell connectors, forming a further overlapping region, comprising:

to exchange a component, the positive and/or firm connection of the component to be exchanged to at least one component not to be exchanged is separated directly next to the overlapping region and a replacement component is connected positively and/or firmly to the overlapping region of the at least one component not be exchanged by the electrical terminal contacts thereof or the connection elements thereof, forming a respectively new overlapping region, wherein the new overlapping region is comprised of the electrical terminal contact of the at least one component not to be exchanged, a detached section of the electrical terminal contact of the separated component to be exchanged, and the electrical terminal contact of the replacement component.

2. The method according to claim 1, wherein the positive and/or firm connection of the component to be exchanged to the at least one component not to be exchanged is separated by sheet cutting, grinding, milling, sawing, laser cutting, water jet cutting and/or micro flame cutting.

3. The method according to claim 1, wherein an individual cell is connected firmly and positively to at least one individual cell not to be exchanged, as a replacement component.

4. The method according to claim 3, wherein the electrical terminal contacts of the individual cell are angled such that the electrical terminal contacts of the individual cell are arranged respectively above or below the overlapping region of the at least one individual cell not to be exchanged.

5. The method according to claim 1, wherein the battery monitoring unit is connected firmly and/or positively to the individual cells of the battery, as a replacement component.

6. The method according to claim 5, wherein the connection elements of the battery monitoring unit are angled such that the connection elements of the battery monitoring unit are arranged respectively above the overlapping region of the individual cells.

7. The method according to claim 1, wherein the positive and/or firm connection of the replacement component to the at least one component not to be exchanged is produced by ultrasonic welding.

8. The method according to claim 5, wherein the positive and/or firm connection of the replacement component to the at least one component not to be exchanged is produced by cold soldering.

9. The method according to claim 8, wherein a soldered sheet is arranged on the new overlapping region.

10. A battery which has, as components, a plurality of individual cells connected to one another in series and/or in parallel, having electrical terminal contacts which are connected to one another positively and/or firmly for electrical connection, directly or by cell connectors, forming an overlapping region, and a battery monitoring unit having a number of connection elements which are positively and/or firmly connected to the electrical terminal contacts and/or to the cell connectors, forming a further overlapping region;

wherein a replacement component has terminal contacts or connection elements angled such that the terminal contacts or connection elements are arranged respectively above and/or below the overlapping region, wherein a new overlapping region is formed, and wherein the new overlapping region is comprised of the electrical terminal contact of a component not to be exchanged, a detached section of the electrical terminal contact of a separated component to be exchanged, and the electrical terminal contact of the replacement component.

* * * * *